(12) United States Patent
Chhabra et al.

(10) Patent No.: US 11,264,224 B2
(45) Date of Patent: Mar. 1, 2022

(54) THERMAL DESORPTION SYSTEMS WITH DRYING DEVICES AND METHODS OF USING THEM

(71) Applicant: PERKINELMER HEALTH SCIENCES, INC., Waltham, MA (US)

(72) Inventors: Puneet Chhabra, Milford, CT (US); Andrew Tipier, Trumbull, CT (US)

(73) Assignee: PerkinElmer Health Sciences, Inc., Waltham, MA (US)

( * ) Notice: Subject to any disclaimer, the term of this patent is extended or adjusted under 35 U.S.C. 154(b) by 382 days.

(21) Appl. No.: 16/232,475

(22) Filed: Dec. 26, 2018

(65) Prior Publication Data
US 2019/0252168 A1     Aug. 15, 2019

Related U.S. Application Data

(60) Provisional application No. 62/610,856, filed on Dec. 27, 2017.

(51) Int. Cl.
| | |
|---|---|
| *B01D 53/04* | (2006.01) |
| *B01J 20/20* | (2006.01) |
| *H01J 49/04* | (2006.01) |
| *G01N 27/622* | (2021.01) |
| *G01N 27/626* | (2021.01) |
| *G01N 27/64* | (2006.01) |
| *H01J 49/14* | (2006.01) |

(52) U.S. Cl.
CPC ............ *H01J 49/049* (2013.01); *B01D 53/04* (2013.01); *B01D 53/0415* (2013.01); *B01D 53/0438* (2013.01); *B01J 20/20* (2013.01); *G01N 27/622* (2013.01); *G01N 27/626* (2013.01); *G01N 27/64* (2013.01); *H01J 49/0431* (2013.01); *H01J 49/14* (2013.01); *B01D 2256/24* (2013.01)

(58) Field of Classification Search
CPC .......................... B01D 53/04; B01D 53/0415; B01D 53/0438; B01D 53/0462; B01D 2256/24; B01D 2257/80; B01J 20/20; G01N 27/622; G01N 27/626; G01N 27/64; H01J 49/0431; H01J 49/049; H01J 49/14
USPC ......... 96/111, 101, 104, 126, 130, 131, 132, 96/413; 73/23.41, 23.42, 31.01, 31.02
See application file for complete search history.

(56) References Cited

U.S. PATENT DOCUMENTS

| | | | | |
|---|---|---|---|---|
| 4,470,298 | A * | 9/1984 | Jibelian ................. | G01N 30/66 73/23.39 |
| 5,405,781 | A * | 4/1995 | Davies ................. | G01N 27/622 250/282 |
| 6,113,869 | A * | 9/2000 | Jain ..................... | C01B 23/0094 423/219 |
| 8,580,010 | B2 * | 11/2013 | Matsuba ............... | B01D 53/06 95/10 |
| 2013/0239814 | A1 * | 9/2013 | Ito ........................ | F24F 3/1429 96/111 |

* cited by examiner

*Primary Examiner* — Frank M Lawrence, Jr.
(74) *Attorney, Agent, or Firm* — Rhodes IP PLC; Christopher R Rhodes

(57) ABSTRACT

A drying device comprising a regenerable desiccant medium that is effective to adsorb water without absorption of gaseous analyte species in an introduced ambient air stream is described. The drying device can be used with a thermal desorption device to remove water vapor from gaseous analyte species prior to analysis of the gaseous analyte species. Systems including a drying device are also described.

25 Claims, 18 Drawing Sheets

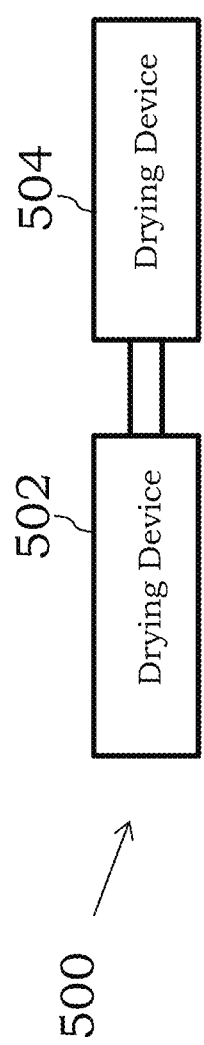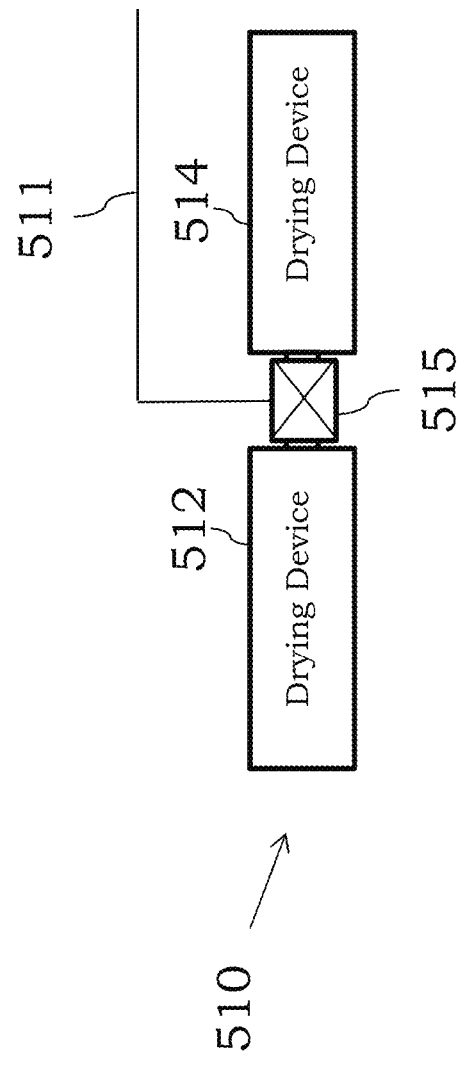
FIG. 5A
FIG. 5B

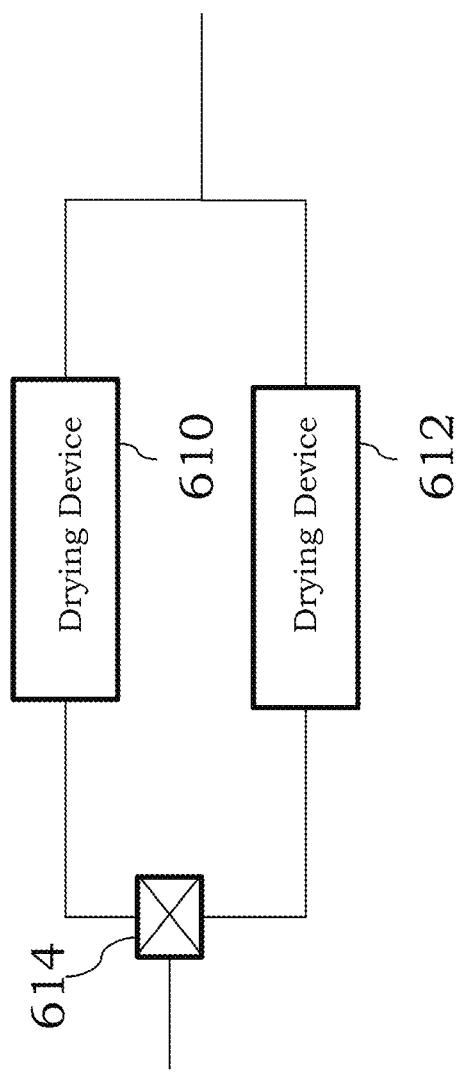
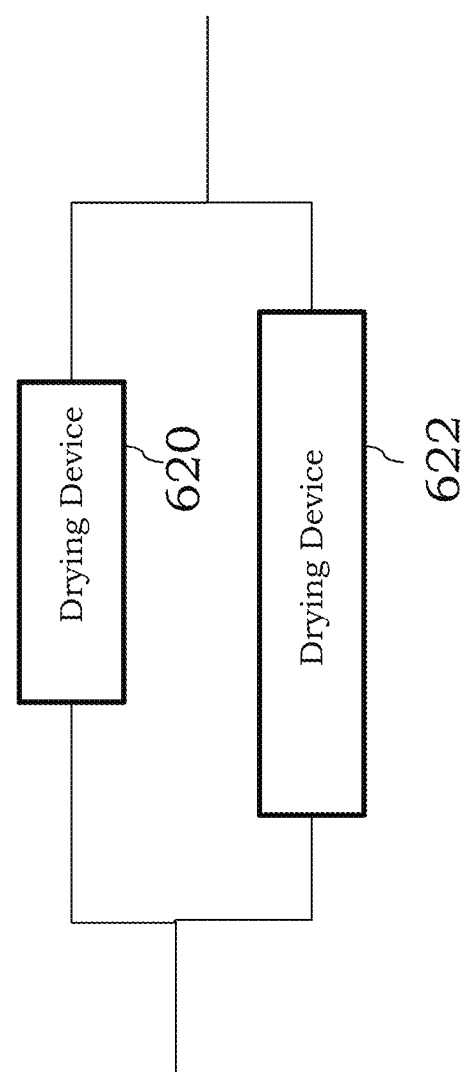

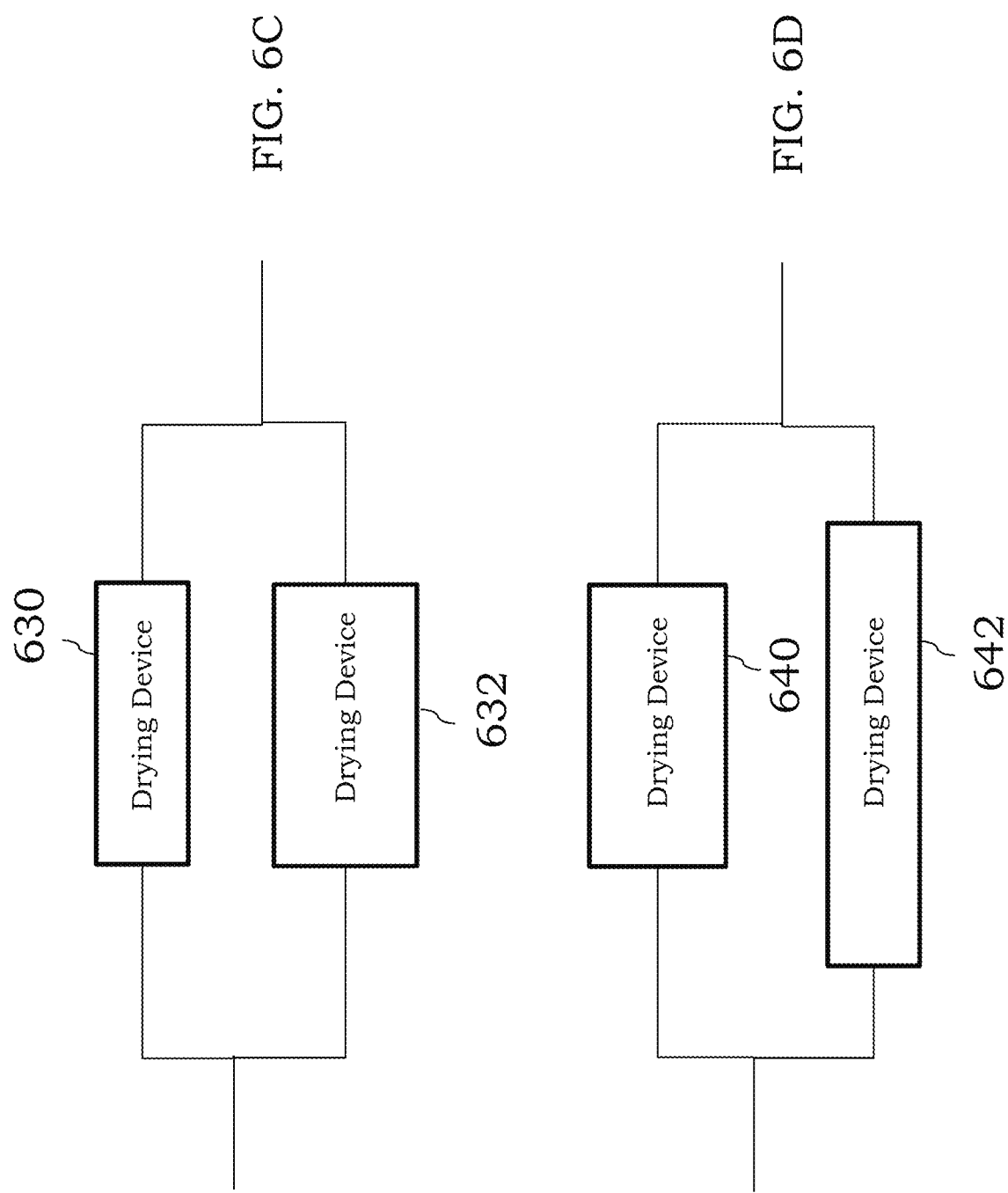

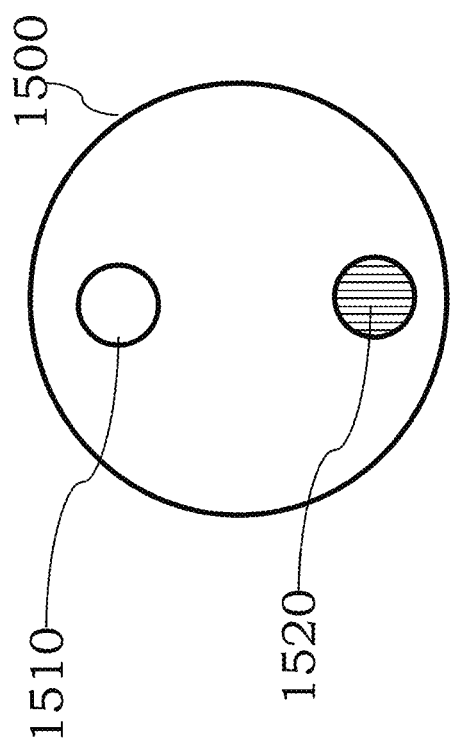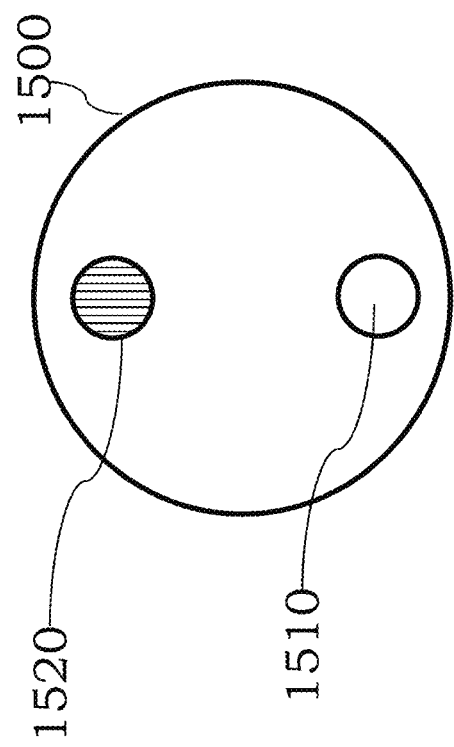

THERMAL DESORPTION SYSTEMS WITH DRYING DEVICES AND METHODS OF USING THEM

PRIORITY APPLICATION

This application is related to and claims priority to and the benefit of U.S. Provisional Application No. 62/610,856 filed on Dec. 27, 2017, the entire disclosure of which is hereby incorporated herein by reference for all purposes.

TECHNOLOGICAL FIELD

Certain configurations described herein are directed to thermal desorption systems with drying devices and methods of using them. In some examples, thermal desorption systems with drying devices comprising a regenerable, desiccant medium are described.

BACKGROUND

Analyte species in air samples can be monitored using thermal desorption techniques. In many instances, light polar compounds are lost during analysis and cannot be easily detected or quantified.

SUMMARY

Various aspects, embodiments, features and configurations are directed to drying devices with a regenerable desiccant medium and systems and devices that include the drying devices.

In a first aspect, a system comprises a sample introduction device configured to introduce an ambient air stream comprising gaseous analyte species and water vapor into a thermal desorption device fluidically coupled to the sample introduction device, and a drying device fluidically coupled to each of the sample introduction device and the thermal desorption device, the drying device positioned between the sample introduction device and the thermal desorption device, in which the drying device comprises a regenerable desiccant medium that is effective to adsorb water without absorption of the gaseous analyte species in the introduced ambient air stream.

In certain embodiments, the regenerable desiccant medium comprises an inorganic salt. In some embodiments, the inorganic salt is a calcium salt or a lithium salt. In other configurations and as noted in more detail below, the system does not include a membrane dryer. In some examples, the system comprises a heating device thermally coupled to the drying device, wherein the regenerable desiccant medium is regenerated by heating of the desiccant medium using the heating device. In some instances, the drying device comprises a tube comprising glass wool present at an inlet of the tube and an outlet of the tube and the desiccant medium is present the glass wool present at the inlet of the tube and the outlet of the tube.

In other embodiments, the system comprises a humidity sensor between the drying device and the thermal desorption device and fluidically coupled to each of the drying device and the thermal desorption device. In some examples, the system comprises a humidity sensor integral to an outlet of the drying device. In certain examples, the thermal desorption device comprises a sorbent tube comprising a sorbent medium and a heating device configured to heat the sorbent tube to desorb analyte species adsorbed to the sorbent medium in the sorbent tube. In certain embodiments, the sample introduction device is configured as an injection manifold.

In other examples, the system comprises a first humidity sensor upstream of the drying device and fluidically coupled to each of the sample introduction device and the drying device, wherein the system further comprises a second humidity sensor downstream of the drying device and fluidically coupled to the drying device and the thermal desorption device.

In additional examples, the system comprises a third humidity sensor fluidically coupled to the drying device and configured to measure moisture in a regenerated air flow exiting the drying device during regeneration of the regenerable, desiccant medium.

In some instances, the system comprises a cooling device thermally coupled to the drying device and configured to cool the regenerable desiccant medium after regeneration.

In certain embodiments, the system comprises a detector fluidically coupled to the thermal desorption device.

In certain embodiments, the drying device comprises a first cavity comprising regenerable, desiccant medium and a second cavity comprising the regenerable, desiccant medium. In some examples, the system comprises a valve between the sample introduction device and the drying device, wherein the valve is configured to fluidically couple the sample introduction device to the first cavity in a first state or position of the valve and is configured to fluidically couple the sample introduction device to the second cavity in a second state or position of the valve.

In some examples, the regenerable, desiccant medium comprises calcium sulfate and the sorbent medium in the sorbent device comprises at least three different carbon black materials or three different graphitized carbon black materials.

In certain embodiments, the system comprises a processor configured to regenerate the regenerable, desiccant medium between each sample introduced into the thermal desorption device.

In some examples, ambient air flow through the drying device is configured to flow against gravity, e.g., in a generally upward direction from bottom to top. In other examples, the system comprises a dry air source fluidically coupled to the drying device. In certain instances, the system comprises a valve downstream of the drying device, wherein the valve downstream of the drying device is configured to open when the regenerable, desiccant medium in the drying device is being regenerated to permit water exiting the drying device to vent from the system.

In another aspect, a method of analyzing gaseous species in a fluid using a thermal desorption device comprises removing gaseous water from the fluid comprising the gaseous analyte species by providing the fluid to a drying device comprising a regenerable desiccant medium, wherein the drying device is positioned upstream of the thermal desorption device to adsorb water in the fluid using the regenerable, desiccant medium and without adsorbing the gaseous analyte species in the fluid to provide a dehumidified fluid comprising the gaseous analyte species. The method may also comprise providing the dehumidified fluid comprising the gaseous analyte species from the drying device to the thermal desorption device to permit adsorption of the gaseous analyte species using a sorbent medium within the thermal desorption device. The method may also comprise sequentially desorbing the adsorbed gaseous analyte species from the sorbent medium. The method may also comprise detecting, e.g., identifying and quantifying, the sequentially desorbed analyte species.

In certain embodiments, the method comprises regenerating the regenerable, desiccant medium between analyses of the fluid by heating the regenerable, desiccant medium to provide a regenerated, desiccant medium. In other embodiments, the method comprises cooling the regenerated, desiccant medium prior to introducing fluid comprising gaseous analyte species into the desiccant device. In further examples, the method comprises detecting a humidity of fluid exiting the drying device during regeneration of the desiccant medium, and maintaining heating of the regenerable, desiccant medium until a detected humidity of less than 5% relative humidity is detected to provide the regenerated, desiccant medium. In some examples, the method comprises regenerating the regenerable, desiccant medium using a dry gas. In certain instances, the method comprises heating the dry gas, the regenerable, desiccant medium or both during the regeneration of the regenerable, desiccant medium.

In some examples, the method comprises configuring the regenerable, desiccant medium to change color when it hydrates, e.g., by using moisture indicating inorganic salts such as cobalt salts or cobalt chloride in, or as part of, the desiccant medium, and detecting the color change using an optical sensor. In other examples, the method comprises configuring the regenerable, desiccant medium as a non-deliquescent, inorganic desiccant medium. In some examples, the method comprises configuring the drying device with a first cavity comprising the regenerable, desiccant medium and a second cavity comprising the regenerable, desiccant medium.

In additional examples, the method comprises configuring the drying device as a modular drying device configured to couple to another drying device to increase the overall length of the drying device.

In another aspect, a method of detecting at least one of alpha-pinene, beta-pinene, ethanol, acetone, formaldehyde, acetaldehyde and benzaldehyde in a gaseous air sample using thermal desorption comprises providing the gaseous air sample to a drying device comprising a regenerable, desiccant medium to remove water in the gaseous air sample without removing at least one of the following compounds: alpha-pinene, beta-pinene, ethanol, acetone, formaldehyde, acetaldehyde and benzaldehyde to provide a dehumidified air sample comprising at least one of the following compounds: alpha-pinene, beta-pinene, ethanol, acetone, formaldehyde, acetaldehyde and benzaldehyde to provide a dehumidified air sample. The method may also comprise providing the dehumidified air sample from the drying device to a thermal desorption device to permit adsorption of at least one of the following compounds: alpha-pinene, beta-pinene, ethanol, acetone, formaldehyde, acetaldehyde and benzaldehyde in the gaseous air sample using a sorbent medium within the thermal desorption device to provide adsorbed analyte species on the sorbent medium. The method may also comprise sequentially desorbing the adsorbed analyte species from the sorbent medium. The method may also comprise detecting the sequentially desorbed analyte species.

In certain examples, the method comprises regenerating the regenerable, desiccant medium between analyses of the gaseous air sample by heating the regenerable, desiccant medium to provide a regenerated, desiccant medium. In some examples, the method comprises cooling the regenerated, desiccant medium prior to introducing fluid comprising the gaseous analyte species into the desiccant device. In certain embodiments, the method comprises detecting a humidity of fluid exiting the drying device during the regeneration of the regenerable, desiccant medium and maintaining heating of the regenerable, desiccant medium until a detected humidity of less than 5% relative humidity is detected to provide the regenerated, desiccant medium.

In other embodiments, the method comprises regenerating the regenerable, desiccant medium using a dry gas. In some examples, the method comprises heating the dry gas, the desiccant medium or both during the regenerating of the regenerable desiccant medium. In additional examples, the method comprises configuring the regenerable, desiccant medium to change color when it hydrates and detecting the color change using an optical sensor. In some embodiments, the method comprises configuring the regenerable, desiccant medium as a non-deliquescent, inorganic desiccant medium. In certain examples, the method comprises configuring the drying device with a first cavity comprising the regenerable, desiccant medium and a second cavity comprising the regenerable, desiccant medium, and using the second cavity when the regenerable, desiccant medium of the first cavity becomes hydrated, and regenerating the regenerable, desiccant medium of the first cavity while the second cavity is being used for analysis. In some examples, the method comprises configuring the drying device as a modular drying device configured to couple to another drying device to increase the overall length of the drying device.

In another aspect, a thermal desorption system comprises a sample introduction device configured to provide a fluid comprising gaseous analyte species and water vapor. The system may also comprise a thermal desorption device configured to receive a sorbent tube comprising a sorbent medium, the sorbent medium effective to adsorb and desorb gaseous analyte species in the fluid, wherein the sorbent medium is effective to adsorb and desorb at least one of alpha-pinene, beta-pinene, ethanol, acetone, formaldehyde, acetaldehyde and benzaldehyde in the fluid. The system may also comprise a drying device fluidically coupled to each of the thermal desorption device and the sample introduction device and positioned between the sample introduction device and the thermal desorption device, wherein the drying device comprises a regenerable, desiccant medium configured to adsorb the water vapor from the fluid without adsorbing the at least one of alpha-pinene, beta-pinene, ethanol, acetone, formaldehyde, acetaldehyde and benzaldehyde in the fluid. The system may also comprise a gas chromatography device fluidically coupled to the thermal desorption device, the gas chromatography device configured to separate desorbed, analytes species received from the thermal desorption device and to detect the separated, analytes species.

In certain embodiments, the regenerable, desiccant medium comprises a calcium salt or a lithium salt or both. In some examples, the system does not include a membrane dryer. In additional examples, the system comprises a heating device thermally coupled to the drying device, wherein the regenerable, desiccant medium is regenerated by heating of the regenerable, desiccant medium using the heating device. In other examples, the system comprises a humidity sensor between the drying device and the thermal desorption device and fluidically coupled to each of the drying device and the thermal desorption device. In some examples, the system comprises a first humidity sensor upstream of the drying device and fluidically coupled to each of the drying device and the sample introduction device, and a second humidity sensor downstream of the drying device and fluidically coupled to the drying device and the thermal desorption device. In certain configurations, the system comprises a third humidity sensor downstream of the drying device and configured to measure moisture in a regenerated air flow exiting the thermal desorption system during regeneration of the regenerable, desiccant medium.

In certain embodiments, the system comprises a cooling device thermally coupled to the drying device and configured to cool the regenerable, desiccant medium after regeneration. In other examples, the system comprises a processor, wherein the processor is configured to regenerate the regenerable, desiccant medium between samples introduced into the thermal desorption device.

In an additional aspect, a sampling device configured to capture gaseous analyte species in a fluid introduced into the sampling device is provides. For example, the sampling device can comprise a sampling tube comprising an inlet, an outlet and a body between the inlet and the outlet, the body of the sampling tube further comprising at least one sorbent medium configured to adsorb and desorb the gaseous analyte species, the sampling device further comprising a drying device fluidically coupled to the sampling tube at the inlet end, the drying device comprising a regenerable, desiccant medium configured to adsorb water in the fluid without adsorbing the gaseous analyte species in the fluid.

In certain configurations, the drying device is configured as a coiled tube comprising the regenerable, desiccant medium. In other configurations, the regenerable, desiccant medium comprises a non-deliquescing inorganic salt or a deliquescing salt disposed or coated onto an inert support. In some examples, an outlet of the drying device comprises threads configured to couple to threads of the inlet of the sampling tube to permit separation of the drying device from the sampling tube. In other examples, the sampling device comprises a humidity sensor positioned between the drying device and the sampling tube. In certain instances, the sorbent medium comprises at least three graphitized carbon black materials.

In some instances, the drying device comprises an inlet, a first outlet and a second outlet, wherein each of the first outlet and the second outlet is fluidically coupled to a respective sampling tube, wherein each sampling tube comprises an inlet, an outlet and a body between the inlet and the outlet, the body of each sampling tube further comprising at least one sorbent medium configured to adsorb and desorb the gaseous analyte species. In other examples, the sorbent medium in the respective sampling tubes is different. In some examples, the regenerable, desiccant medium comprises a calcium salt or a lithium salt. In certain examples, the calcium salt or lithium salt comprises an indicator that changes color when it hydrates.

Additional aspects, configurations, features, examples and embodiments of systems and devices that include a drying device are described in more detail below.

BRIEF DESCRIPTION OF THE SEVERAL VIEWS OF THE DRAWINGS

Certain configurations of devices and systems comprising drying devices are described below with reference to the figures in which:

FIGS. 5A, 5B, 5C, 5D and 5E are illustrations of different configurations of serially coupled drying devices, in accordance with some embodiments;

FIGS. 6A, 6B, 6C, and 6D are illustrations of different configurations of parallel drying devices, in accordance with certain embodiments;

FIGS. 15A and 15B are illustrations of a carousel comprising two drying device, in accordance with certain embodiments;

Figure 1:
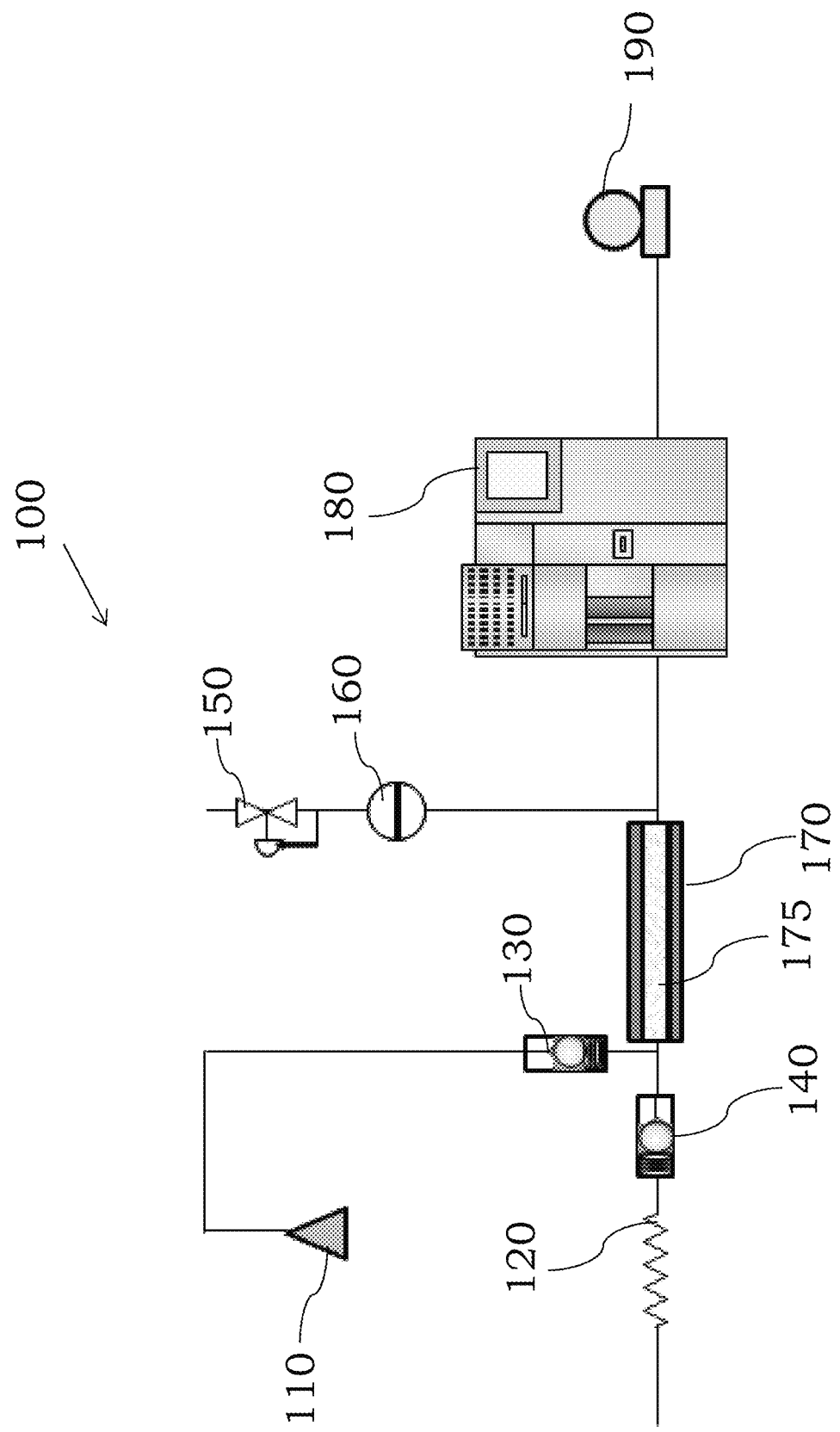
FIG. 1 is an illustration of a thermal desorption system comprising a drying device, in accordance with certain configurations.

It will be recognized by the person of ordinary skill in the art, given the benefit of this disclosure, that the dimensions of the figure components are not limiting and are shown for illustration purposes. Further, the length and dimensions of any fluid lines that couple two or more component of the system can vary. In addition, the drying devices described herein can be configured as linear tubes (as shown in certain figures) or can be angled, coiled or take other geometric shapes as desired.

DETAILED DESCRIPTION

Certain configurations of thermal desorption systems comprising a drying device are described. The exact placement and configuration of the drying device can vary as desired. In addition, more than a single drying device may also be present in the systems or drying devices of different configurations can be present in a single system.

Water is present in almost all ambient samples. The relatively high concentration of water compared to that of trace analytes poses a complication in the separation, detection, and quantification of the analytes. Moisture will freeze in cold tube traps, which can block sample flow. Water can also damage GC columns and interfere with detectors.

In certain embodiments, conventional thermal desorption systems can use a membrane based dryer such as a Nafion® membrane. Nafion® polymer is a thin, chemically resistant sulfonated tetrafluoroethylene based fluoropolymer-copolymer produced by DuPont. The sulfonic acid groups in the copolymer are highly hydrophilic, absorbing water from the surrounding air streams. Nafion® based driers operate as a shell and tube exchanger, in which a humid air stream in a tube flows countercurrent to a dry air stream in the shell. Water passes from the humid sample stream to the dry air stream through the Nafion® membrane acting as a selective semi-permeable membrane. Hydrocarbons are not lost through the membrane, though alcohols and compounds that can gain alcohol functionality through acid catalysis (carbonyls and alkenes) can pass through or heterogeneously react with the membrane. For example, alpha-pinene, a biogenic volatile organic compound (VOC) of interest, can undergo acid catalyzed isomerization or hydration to form as many as ten other compounds. In comparison to Nafion® membrane dryers, certain configurations described herein permit the drying of the sample without substantial loss of the polar analytes.

In other conventional systems, a dry purge is used to try and remove water from the analytes. Many of the stronger adsorbents used to pack thermal desorption tubes and traps are slightly hydrophilic and can retain a significant fraction of water vapor from a sample stream even at ambient temperature. Most organic compounds are more strongly adsorbed than water, so a flow of dry gas across the adsorbent will preferentially remove water at ambient or higher temperatures. The dry purging technique cannot typically be used in the determination of very light compounds such as ethane, ethylene and acetylene which need the adsorbent to be cooled in order to be retained.

In certain embodiments, the devices and systems described herein may comprise a solid, regenerable desiccant material that can be used to dry air samples, e.g., to adsorb water vapor in the air samples, without substantial loss of any polar analytes in the air samples. While the exact material and configuration used in the drying device can vary illustrative materials include but are not limited to Group I metal salts, Group II metal salts, Group I metal halide salts, Group II metal halide salts, Group I metal carbonate salts, Group II metal carbonate salts, Group I metal sulfate salts, and Group II metal sulfate salts that can adsorb water and desorb water upon heating. The reversible adsorption of the water permits regeneration of the desiccant material of the drying device to facilitate re-use multiple times. As noted in more detail below, the desiccant material of the drying device can be automatically regenerated to continuously recycle used desiccant material for subsequent drying uses. The drying device is typically integral to system comprising a thermal desorber to permit sampling and/or analysis of various different gaseous analytes.

Figure 2:
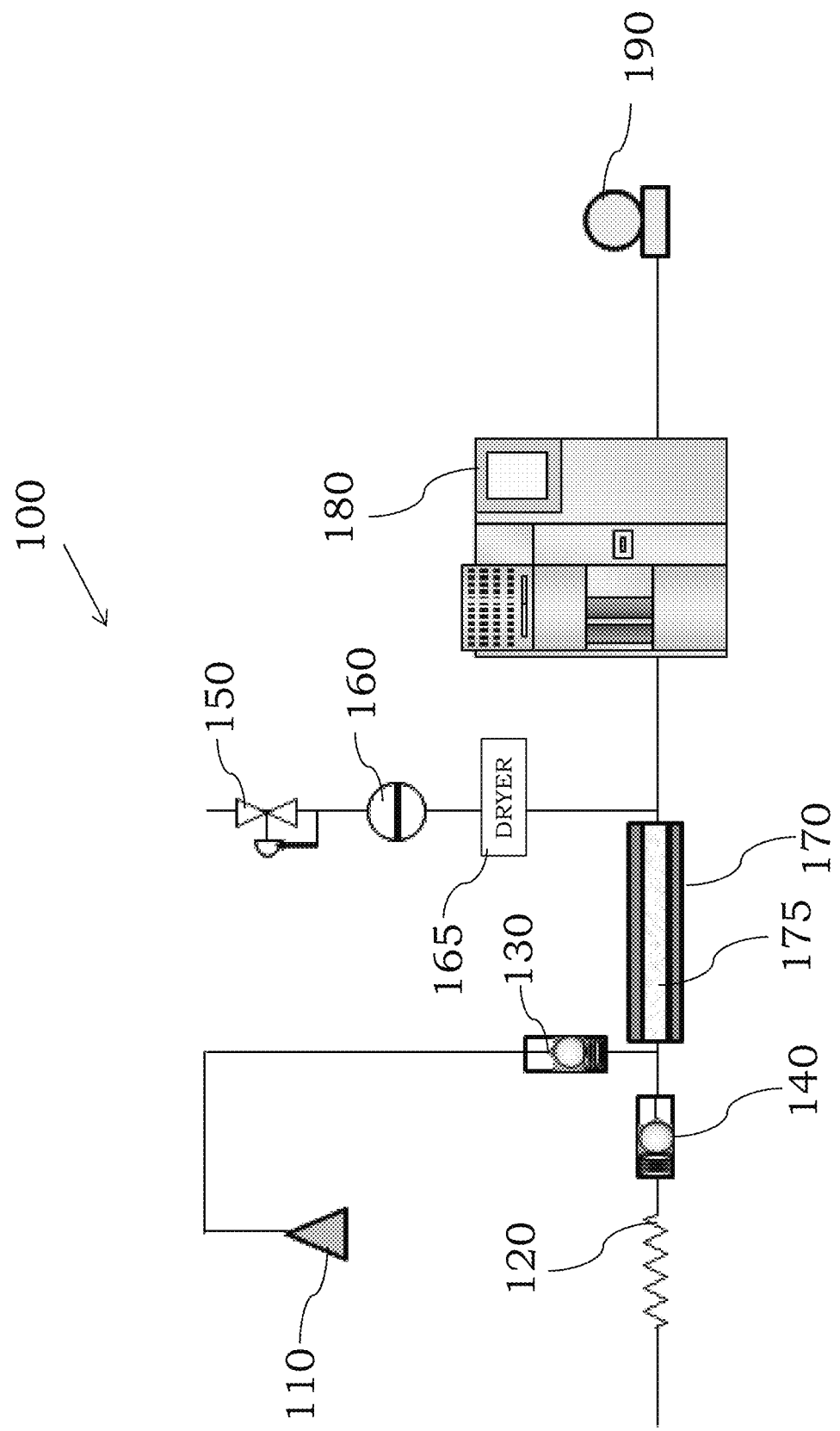
FIG. 2 is another illustration of a thermal desorption system comprising a drying device, in accordance with certain configurations.

In certain configurations and referring to FIG. 1 a thermal desorption system 100 is shown for illustration purposes to describe some aspects of the technology. The system 100 comprises a sampling inlet 110, a fixed flow restrictor 120, a first check valve 130, a second check valve 140, a pressure regulator 150 fluidically coupled to a clean air supply (not shown), a 2-way solenoid valve 160, a drying device 170 comprising a desiccant material 175, a thermal desorption device 180 and a vacuum pump 190. Depending on the intended use of the system 100, fewer components may be present or additional components may be present. For example, where the sample is known to be dry, a bypass line can be present to bypass the drying device 170. In an illustrative use of the system 100, during sampling the 2-way solenoid valve 160 closes, causing the second check valve 140 to close and the first check valve 130 to open. This configuration permits air to be sampled to be drawn into the system 100 through the first check valve 130. The sampled air passed through the drying device 170 and into the thermal desorption device 180 for analysis. After sampling, the 2-way solenoid valve 160 opens, and the resulting pressure from the dry, clean air supply switches the check valves 130, 140 to allow air to flow over the wetted desiccant material 175 of the drying device 170. As noted in more detail below, the desiccant material 175 of the drying device 170 can also be heated during this time to regenerate the desiccant material 175 prior to additional sampling of the air. If desired, a dryer 165 (see FIG. 2) can also be present between the pressure regulator 150 and the desorption device 180 to ensure dry gas is introduced into downstream components of the system. In some instances, the dryer 165 may comprise a Nation® membrane, may be configured as a purge dryer or may comprise a desiccant material similar to the drying device 170.

Figure 3:
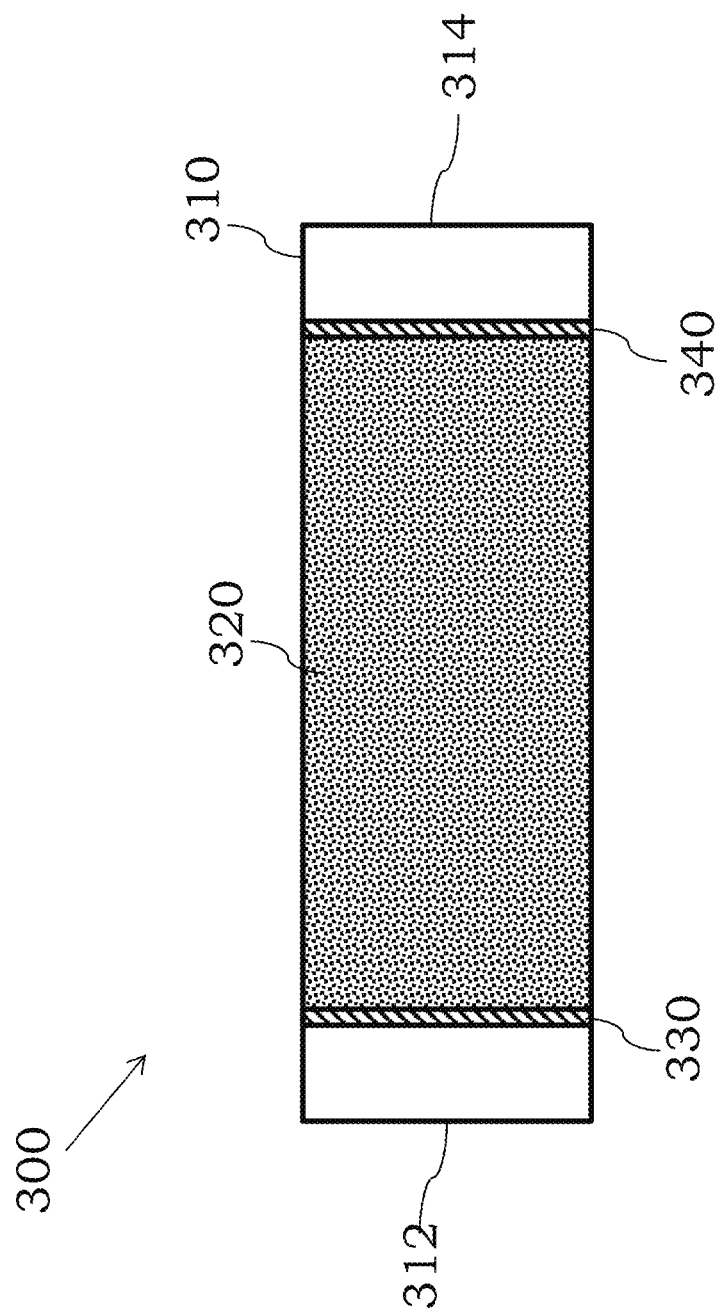
FIG. 3 is an illustration of a drying device, in accordance with certain examples.

In certain embodiments, the exact configuration of the drying device used in the devices and systems described herein may vary. Referring to FIG. 3, one illustration of a drying device 300 is shown that comprises a cavity or tube 310 with a hollow interior configured to receive a desiccant material 320. The desiccant material 320 is typically a solid material that can be loosely packed into the hollow interior of the cavity 310. In some instances, fluid permeable barriers 330, 340 may be present at an inlet 312 and an outlet 314, respectively of the cavity 310. The fluid permeable barriers 330, 340 can act to retain the desiccant material 320 within the interior of the tube 310 while still permitting the passage of analyte species. The material of the fluid permeable barriers 330, 340 can be selected so that they are inert and do not react with the analyte species present in the sampled air.

Figure 4B:
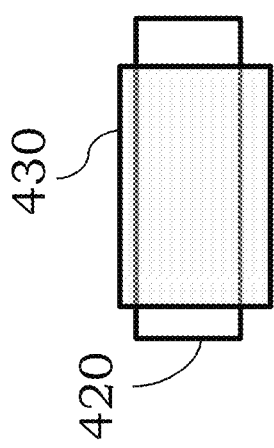
FIGS. 4A, 4B, 4C and 4D are illustrations showing different heating devices thermally coupled to a drying device, in accordance with certain configurations.
Figure 4D:
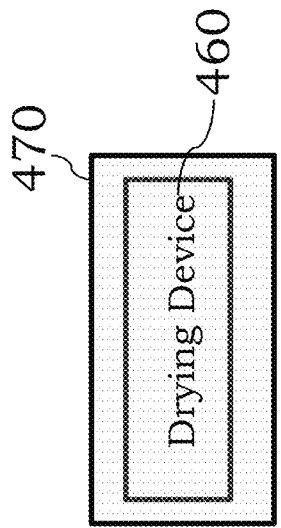
Figure 4A:
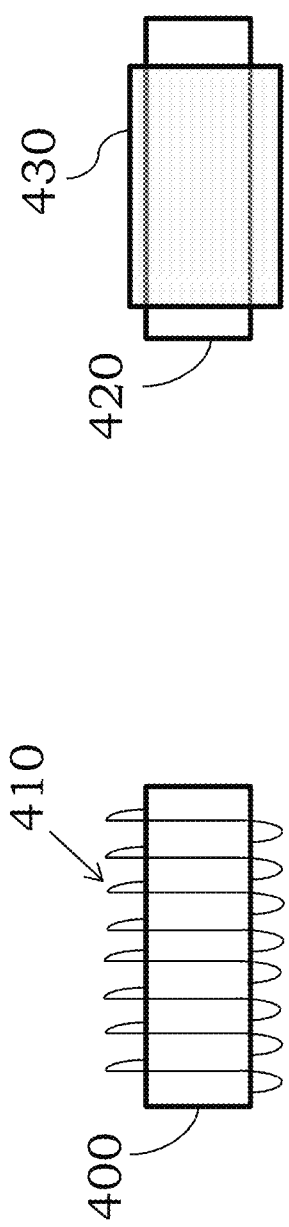
Figure 4C:
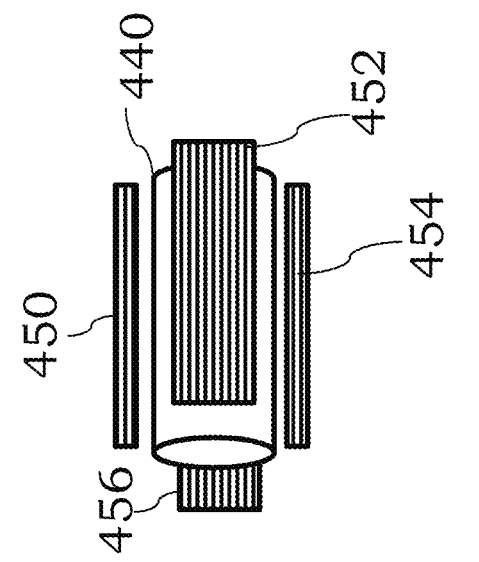

In some instances and referring to FIG. 4A, the drying device may comprise a heating coil or heating device to increase the temperature of the desiccant material to regenerate the desiccant material. For example, the drying device 400 may comprise a heating coil 410 thermally coupled to drying device 400. The heating coils can be heated, e.g., by passing a current through them, to increase the temperature of the desiccant material in the drying device 400 to regenerate the desiccant material, e.g., to drive off or desorb any adsorbed water molecules. In FIG. 4B, the heating device is configured as a heating jacket 430 that surrounds the drying device 420. Similar to the heating coils of FIG. 4A, the heating jacket 430 can provide heat to the desiccant material of the drying device 420 to regenerate the desiccant material. In FIG. 4C, the heating device is configured as a plurality of plates 450, 452, 454 and 456 thermally coupled a drying device 440. Each of the plates 450-456 can be heated to increase the temperature of desiccant material within the drying device 440 to regenerate the desiccant material. In FIG. 4D, the heating device is configured as a microwave device 460 thermally coupled to a drying device 470. Microwave energy can be used to promote vaporization of any water molecules within desiccant material of the drying device. A dry air stream (not shown) can be provided to any of the drying devices shown in FIGS. 4A-4D to assist in removal of the water from the drying devices. Additional heating devices, e.g., ceramic heaters, thermoelectric heaters, may also be used to regenerate the desiccant material. As noted in more detail below, the heating device can be controlled using a processor which is typically part of the thermal desorption device or a gas chromatography device. In some examples, the heating device is configured to heat the desiccant material between each sample analysis to provide for automated regeneration of the desiccant material. In other examples, the heating device is configured to heat the desiccant material between every other sample analysis to provide for automated regeneration of the desiccant material. Other heating intervals can also be selected as desired.

In some instances, the drying devices described herein may also be thermally coupled to a cooling device to cool the desiccant material prior to use. While not wishing to be bound by any particular configuration, the cooling device can lower the temperature of the desiccant material but typically maintains the desiccant material above the condensation temperature of water to ensure the water within the drying device remains in the gas phase for easy regeneration of the desiccant material. In other instances, the cooling device can be used to restore the temperature of the desiccant material back to a sampling temperature after the temperature of desiccant material has been increased during the regeneration of the desiccant material.

Figure 5C:
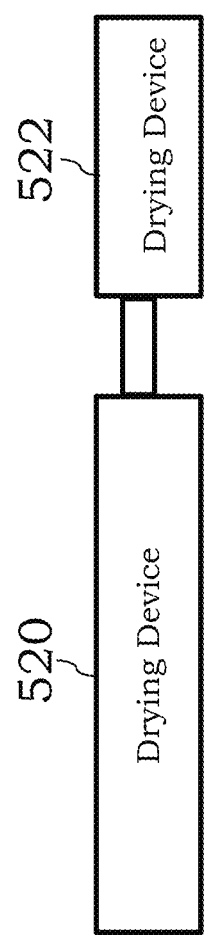

In some examples and referring to FIGS. 5A-5E, the drying devices described herein can be configured with more than a single tube or cavity. Referring specifically to FIG. 5A, a drying device 500 comprises a serial arrangement of two drying devices or two tubes 502, 504. A serial arrangement of tubes can be used, for example, to increase the overall water loading capacity of the drying device 500. In some instances, desiccant material in the tubes or devices 502, 504 are the same material, whereas in other instances the desiccant material in the different devices 502, 504 can be different desiccant materials. In FIG. 5A, the devices or tubes 502, 504 generally have the same length and inner diameter, though as noted below these similarities are not required. Further, more than a single type of desiccant material can be present in either or both of the devices 502, 504. If desired, the tubes 502, 504 can be configured as modular tubes which can plug into each other to increase the overall length of a drying device.

Referring to FIG. 5B, in some configurations a bypass line 511 can be present in a drying device 510 to bypass a second tube 514 and only use a first tube 512 comprising desiccant material. Where additional water removal capacity is needed, the bypass line 511 can be closed by changing the configuration of a valve 515 so that air sample can flow through both tubes 512, 514 and so that desiccant material in the second tube 514 is available to remove water from the air sample. The valve 515 typically is a low cost 3-way solenoid valve. In certain examples, desiccant material in the devices 512, 514 are the same material, whereas in other instances the desiccant material in the different devices 512, 514 can be different desiccant materials. Further, more than a single type of desiccant material can be present in either or both of the devices 512, 514.

In other instances where two or more drying devices are serially coupled to each other, the drying devices need not have the same dimensions. Referring to FIG. 5C, a first drying device 520 is shown fluidically coupled to a second drying device 522. The inner diameter of the drying devices 520, 522 is about the same but a length of the drying device 520 is substantially greater than a length of the drying device 522. If desired, the length of the drying device 522 could instead be greater than a length of the drying device 520. While not shown in FIG. 5C, a bypass line can be present to bypass the downstream drying device if desired. In some instances, desiccant material in the drying devices 520, 522 are the same material, whereas in other instances the desiccant material in the different devices 520, 522 can be different desiccant materials. Further, more than a single type of desiccant material can be present in either or both of the devices 520, 522.

Figure 5D:
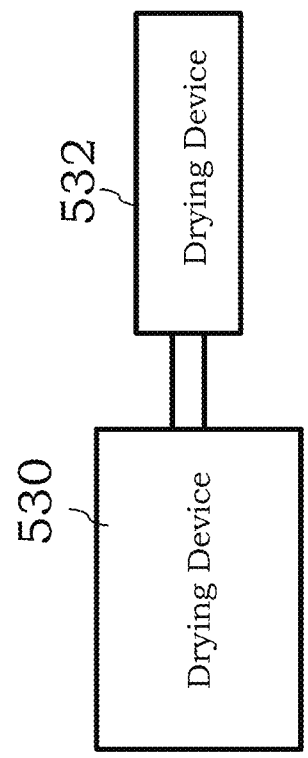

In additional instances where two or more drying devices are serially coupled to each other, the drying devices need not have the same inner diameter. Referring to FIG. 5D, a first drying device 530 is shown fluidically coupled to a second drying device 532. The inner diameter of the drying devices 530, 532 is different but a length of the drying devices 530, 532 is about the same. If desired, the inner diameter of the drying device 534 could instead be greater than an inner diameter of the drying device 532. While not shown in FIG. 5D, a bypass line can be present to bypass the downstream drying device if desired. In some examples, desiccant material in the drying devices 530, 532 are the same material, whereas in other instances the desiccant material in the different devices 530, 532 can be different desiccant materials. Further, more than a single type of desiccant material can be present in either or both of the devices 530, 532.

Figure 5E:
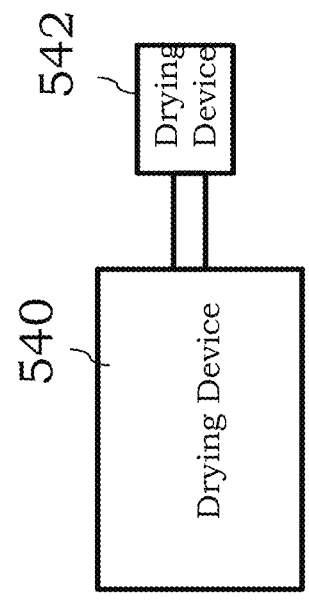

In other configurations where two or more drying devices that are serially coupled to have different dimensions, both the length and the width of the drying devices can be different Referring to FIG. 5E, a first drying device 540 is shown fluidically coupled to a second drying device 542. The inner diameter and the length of the drying devices 540, 542 are different. The exact positioning of the drying devices 540, 542 can vary and in some instances the drying device with a larger inner diameter and length can be upstream of a second drying device, whereas in other configurations the drying device with a larger inner diameter and length can be downstream of another drying device. While not shown in FIG. 5E, a bypass line can be present to bypass the downstream drying device if desired. In certain instances, desiccant material in the drying devices 540, 542 are the same material, whereas in other instances the desiccant material in the different devices 540, 542 can be different desiccant materials. Further, more than a single type of desiccant material can be present in either or both of the devices 540, 542.

In certain configurations, two or more parallel drying devices can be used in the systems and devices described herein. Referring to FIG. 6A, a first drying device 610 and a second drying device 612 are shown. A valve 614 is upstream of each of the first drying device 610 and the second drying device 612 to permit fluidic coupling to one or both of the drying devices 610, 612. For example, in a first state of the valve 614, fluid can flow from a sample introduction device (not shown) through the valve 614 and through the first drying device 610. No fluid flows through the second drying device 612 in the first state of the valve 614. In a second state of the valve 614, fluid can flow from a sample introduction device (not shown) through the valve 614 and through the second drying device 612. No fluid flows through the first drying device 610 in the second state of the valve 614. When the valve 614 is in the second state and where the first drying device 610 comprises a desiccant material, the desiccant material in the first drying device 610 can be regenerated while the second drying device 612 is being used. Once the desiccant material in the first drying device 610 is regenerated, the valve 614 can switch from the second state back to the first state to provide fluid flow into the first drying device 610. Desiccant material (when present) in the second drying device 612 can then be regenerated. This dual drying device configuration permits continuous sampling of the atmosphere without needing to stop between sample runs to permit regeneration of the desiccant material in a single drying device. In other instances, the valve 614 can be configured such that fluid flow through both of the drying devices 610, 612 at the same time.

In other instances, one of the drying devices 610, 612 may be a Nation® membrane device or a dry purge device and the other one of the drying devices 610, 612 may be a drying device comprising a desiccant material. For example, where low molecular weight polar analytes are being analyzed, it may be desirable to use the drying device with the desiccant material to avoid absorption of the polar analytes by the drying device. Where no low molecular weight polar analytes are present or analyzed, it may be desirable to use the membrane based drying device or the dry purge device instead. The presence of parallel drying devices of different configuration permits real time selection of the particular drying device to be used without the need to swap out different drying devices.

In some examples where two or more parallel drying devices are present, the drying devices need not have the same dimensions. Referring to FIG. 6B, a first drying device 620 is shown in parallel with a second drying device 622. The inner diameter of the drying devices 620, 622 is about the same but a length of the drying device 622 is substantially greater than a length of the drying device 620. If desired, the length of the drying device 620 could instead be greater than a length of the drying device 622. While not shown in FIG. 6B, a crossover line can be present to fluidically couple the different drying devices 620, 622. Similarly, a valve (not shown) can be present to direct fluid to one or both of the devices 620, 622. In some instances, desiccant material in the drying devices 620, 622 are the same material, whereas in other instances the desiccant material in the different devices 622, 622 can be different desiccant materials. Further, more than a single type of desiccant material can be present in either or both of the devices 620, 622.

In additional instances where two or more parallel drying devices are present, the drying devices need not have the same inner diameter. Referring to FIG. 6C, a first drying device 630 is shown in parallel with a second drying device 632. The inner diameter of the drying devices 630, 632 is different but a length of the drying devices 630, 632 is about the same. If desired, the inner diameter of the drying device 630 could instead be greater than an inner diameter of the drying device 632. While not shown in FIG. 6C, a crossover line can be present to fluidically couple the devices 630, 632. Similarly, a valve can be present to direct fluid to one or both of the devices 630, 632. In some examples, desiccant material in the drying devices 630, 632 are the same material, whereas in other instances the desiccant material in the different devices 630, 632 can be different desiccant materials. Further, more than a single type of desiccant material can be present in either or both of the devices 630, 632.

In other configurations where two or more parallel drying devices are present, both the length and the width of the drying devices can be different. Referring to FIG. 6D, a first drying device 640 is shown fluidically coupled to a second drying device 642. The inner diameter and the length of the drying devices 640, 642 are different. While not shown in FIG. 6D, a crossover line can be present to fluidically couple the drying devices 640, 642. Similarly, a valve can be present to direct fluid to one or both of the devices 640, 642. In certain instances, desiccant material in the drying devices 640, 642 are the same material, whereas in other instances the desiccant material in the different devices 640, 642 can be different desiccant materials. Further, more than a single type of desiccant material can be present in either or both of the devices 640, 642.

Figure 7:
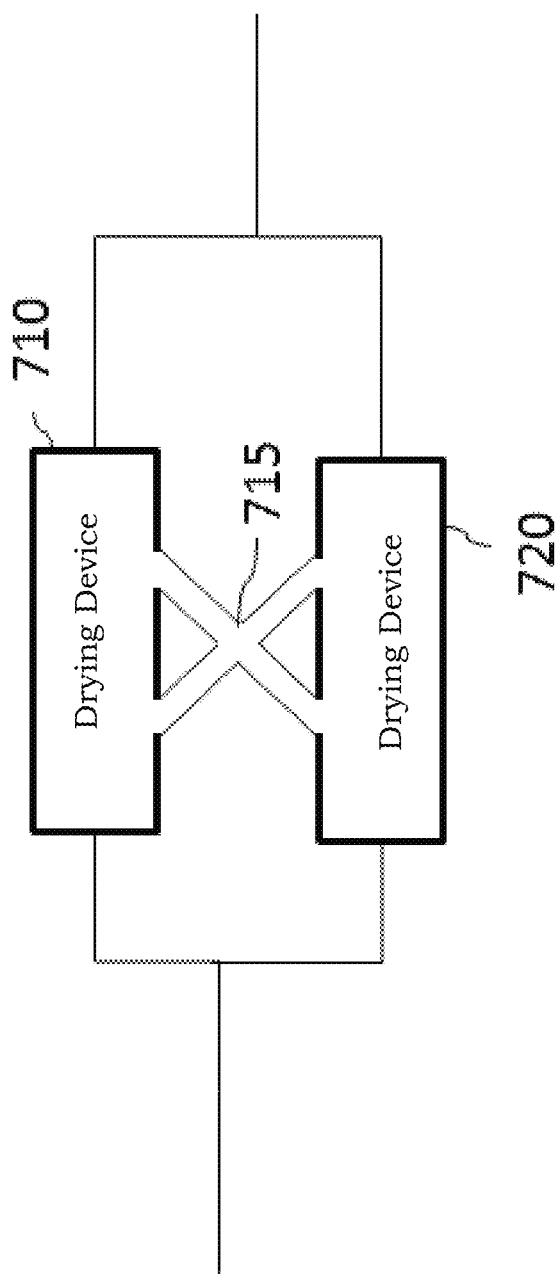
FIG. 7 is an illustration of parallel drying devices comprising a crossover line, in accordance with certain examples.

In some configurations, one or more crossover lines may be present to fluidically couple two or more parallel drying devices. Referring to FIG. 7, a first drying device 710 and a second drying device 720 are shown. A crossover line 715 permits passage of fluid between the device 710, 712 and may assist in balancing pressures in a system of device comprising parallel drying devices. In this configuration, the crossover line 715 comprises an X-shaped configuration though other shapes such as H-shapes, Y-shapes, etc. are also possible. While not shown, the crossover line may comprise one or more internal valves to permit fluid to flow or not flow between the various drying devices 710, 720 through the crossover line 715.

In certain examples, the exact desiccant material present in the drying devices described herein can vary. The desiccant material is typically a non-deliquescing material that remains solid even when hydrated. In some embodiments, the desiccant material comprises one or more Group I metal salts, Group II metal salts, Group I metal halide salts, Group II metal halide salts, Group I metal carbonate salts, Group II metal carbonate salts, Group I metal sulfate salts, and Group II metal sulfate salts that can adsorb water and desorb water upon heating. In some instances, the desiccant material may comprise one or more of sodium sulfate, sodium carbonate, magnesium sulfate, calcium chloride, calcium sulfate, lithium chloride, lithium bromide, or other halide, chloride, bromide, carbonate or sulfate salts. Prior to use, the desiccant material is typically present in anhydrous form and may hydrate upon adsorption of water from a sample fluid stream. Regeneration of the desiccant material dehydrates the desiccant material restoring it to the anhydrous form. In some instances, the drying device may comprise two or more different desiccant materials to increase overall capacity. Further, while a heating device may be external to the drying device, heating coils or wires may also be internal and generally adjacent to and in contact with the desiccant material to assist in dehydrating the desiccant material as needed.

In some examples, the desiccant material may comprise an indicator which changes color upon hydration. For example, the desiccant may change color from pink to blue upon being hydrated to provide an optical indicator of the hydration status of the desiccant material. In some examples, an optical sensor can be present within the systems and used to measure the color of the desiccant material to determine if regeneration is needed prior to additional sampling runs.

In certain embodiments, the exact amount of desiccant material used in the drying device may vary based on the dimensions and geometry of the drying device. In some embodiments, at least 75% by volume, based on the inner volume of the drying device, comprises a desiccant material. In other instances, at least 85% or 90% by volume, based on the inner volume of the drying device, comprises a desiccant material. In some instances, the desiccant material may be sandwiched between frit material, glass wool material or inert materials which can retain the desiccant material within the drying device. For example, where the desiccant material deliquesces, the desiccant material can be disposed, coated or otherwise present on an inner support material. Alternatively, a non-deliquescing desiccant material may be disposed between two or more inert materials that function as barriers to retain the desiccant material within the drying device. Generally, the frit material, glass wool material or other materials are inert and do not react with any analytes in the sample air stream. If desired, the ends of the cavity comprising the desiccant medium can be sealed prior to use to prevent ambient water from entering into the drying device and cause hydration of the desiccant medium.

Figure 8:
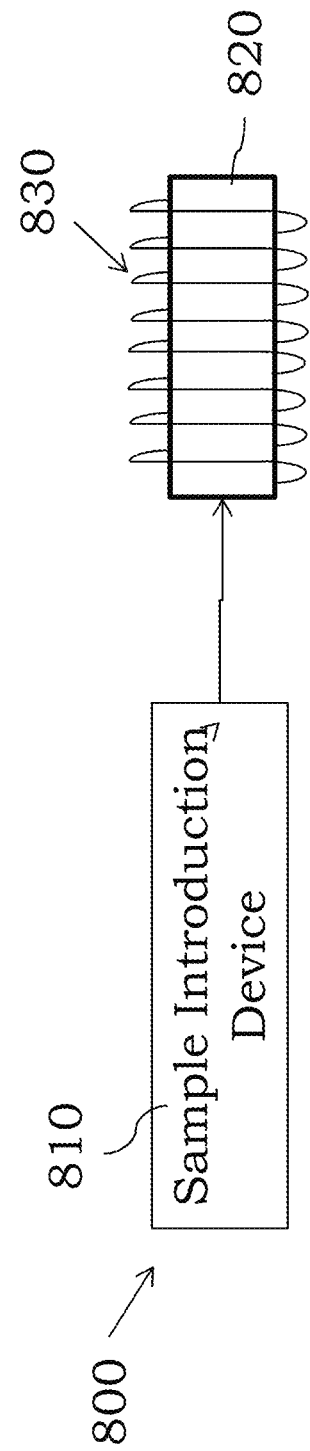
FIG. 8 is an illustration of a system comprising a sample introduction device and a drying device, in accordance with certain configurations.

In certain examples, the drying devices described herein may be used in a system comprising a sample introduction device. Referring to FIG. 8, a system 800 is shown comprising a sample introduction device 810 and a drying device 820. The sample introduction device 810 is configured to introduce an ambient air stream comprising gaseous analyte species and water vapor into a downstream thermal desorption device (not shown) fluidically coupled to the sample introduction device. The sample introduction device 810 may be an inlet, a manifold, a microfluidic device, an injector or other species depending on the analyte sampling method used. Prior to providing the ambient air stream to the thermal desorption device, the air is provided to the drying device 820 which is coupled to the sample introduction device 810 at one end and to the thermal desorption device at an opposite end. As noted herein, the drying device 820 comprises a regenerable desiccant medium that is effective to adsorb water without absorption of the gaseous analyte species in the introduced ambient air stream. The exact desiccant material present in the drying device 820 may vary and illustrative materials include but are not limited to an inorganic salt such as, for example, a sodium salt, a magnesium salt, a calcium salt or a lithium salt. Where a deliquescing desiccant material is present in the drying device 820, the desiccant material can be coated or disposed on an inert support within the drying device 820. Illustrative inert support materials are described herein and include, for example, glass wool, frits, diatomaceous earth or other siliceous based materials. In instances where the system 800 is used to analyze polar analytes, the system 800 can be configured without a membrane dryer to avoid absorption of the polar analytes by the membrane.

In certain embodiments, the drying device 820 may comprise a heating device 830 thermally coupled to the drying device 820 so the regenerable desiccant medium can be regenerated by heating of the desiccant medium using the heating device 830. The heating device 830 may be a heating coil (as shown in FIG. 8), heating tape, a heating jacket, heating plates or may take other configurations as desired.

In some configurations, the drying device 820 can be configured as a cavity or tube that comprises glass wool present at an inlet of the tube and an outlet of the tube. The desiccant medium can be present between the glass wool that is present at the inlet of the tube and the outlet of the tube.

Figure 9:
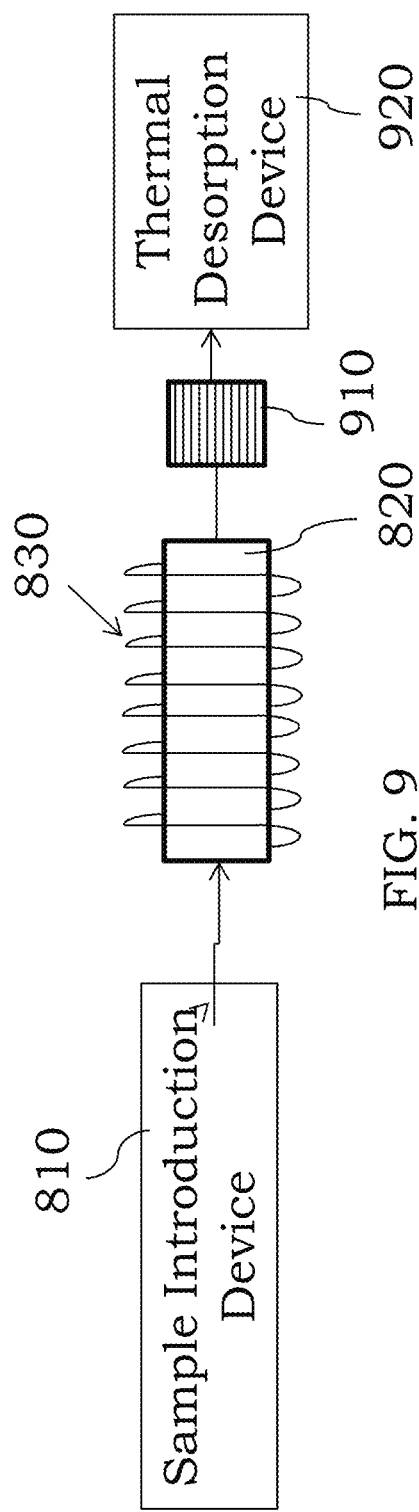
FIG. 9 is an illustration of a system comprising a sample introduction device, a drying device, a humidity sensor and a thermal desorption device, in accordance with certain examples.
Figure 10:
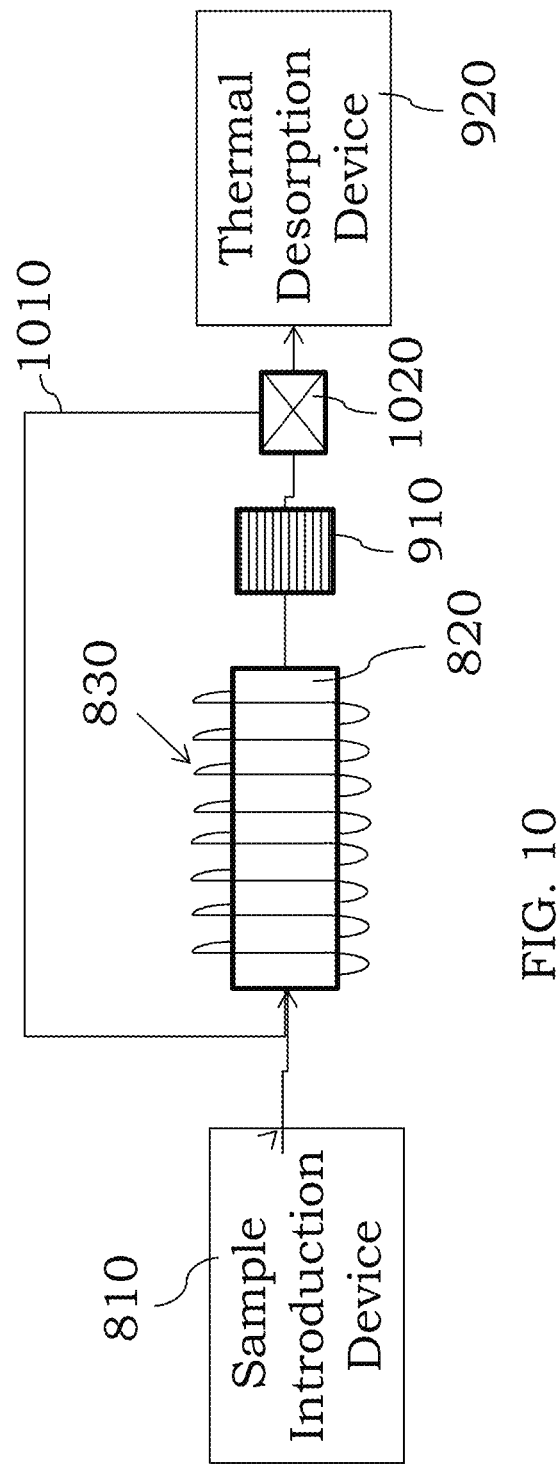
FIG. 10 is an illustration of a system comprising a sample introduction device, a drying device, a humidity sensor, a thermal desorption device and a return line, in accordance with certain examples.

In additional configurations and referring to FIG. 9, a humidity sensor 910 can be present between the drying device 820 and a thermal desorption device 920 to measure the amount of water in the fluid exiting the drying device 820. For example, if water levels in fluid exiting the drying device 820 are still too high, then measurements may be stopped until a drying device with increased moisture removal capacity is installed. Alternatively, a fluid line 1010 can be present as shown in FIG. 10 to return the fluid back to the drying device 820 if high moisture levels are measured. The fluid line 1010 can be opened by actuating a valve 1020 to permit fluid flow through the fluid line 1010 and back to an inlet of the drying device 820. Fluid may continuously flow through the fluid line 1010 until suitable moisture levels are measured by the humidity sensor 910. The valve 1020 can then be actuated to permit the fluid to flow to the thermal desorption deice 920. In some examples, a humidity sensor may be integral to the drying device, e.g., positioned at an outlet of the drying device, to measure the level of water in the exiting fluid.

In certain embodiments, the thermal desorption devices described herein may comprise one or more sorbent tubes comprising a sorbent medium that can adsorb and desorb analyte species. For example, a sorbent tube typically comprises an arrangement of sorbent materials packed within the tube to adsorb different molecular weight species. In certain embodiments, the sorbent tubes used in the thermal desorption systems and methods described herein can include one, two, three, four, five or more different sorbent materials. In some embodiments, two or more of the sorbent materials may be different, whereas in other embodiments two or more of the sorbent materials may be the same. The exact material used in the sorbent tubes can vary depending on the sampling conditions, desorption conditions, etc. In some examples, the sorbent tube can include a material comprising glass beads, glass wool, glass particles or combinations thereof or glass beads by themselves in combination with one or more other materials. While not wishing to be bound by any particular theory or configuration, glass beads generally do not adsorb any of the analyte species, but the glass beads can provide a high surface area to permit condensation of high molecular weight species, e.g., C22 and above, at the front end of the sorbent tubes. The glass beads effectively remove the higher molecular weight species at the front end and permit the lower molecular weight species to travel down the sorbent tube and be adsorbed by one of the sorbent materials packed in the sorbent tube. In certain instances, two or more different types of glass beads can be present. In some embodiments, it may not be necessary to include a packed material to retain higher molecular weight components, e.g., C22 and above. As such, the sorbent tube may include internal surface features with high surface areas, e.g., integral glass beads, caps, chevrons, fins, glass beads etc. to retain the higher molecular weight components in the sorbent tube.

In some examples, one or more of the sorbent materials present in the sorbent tube can be a graphitized carbon black such as, for example, Carbotrap™ B sorbent or Carbopack™ B sorbent, Carbotrap™ Z sorbent or Carbopack™ Z sorbent, Carbotrap™ C sorbent or Carbopack™ C sorbent, Carbotrap™ X sorbent or Carbopack™ X sorbent, Carbotrap™ Y sorbent or Carbopack™ Y sorbent, Carbotrap™ F sorbent or Carbopack™ F sorbent, any one or more of which may be used in its commercial form (available commercially from Supelco or Sigma-Aldrich) or may be graphitized according to known protocols. In other examples, the sorbent material can be carbon molecular sieves such as Carboxen™ 1000 sorbent, Carboxen™ 1003 sorbent, or Carboxen™-1016 sorbent, any one or more of which may be used in its commercial form (available commercially from Supelco or Sigma-Aldrich or other companies) or may be optimized according to known protocols. The sorbent materials are typically arranged with the weakest sorbent material closest to a sampling inlet and a strongest sorbent material closest to a sampling outlet.

In use of the thermal desorption device, the dried analyte fluid can be provided from the drying device into the sorbent tube of the thermal desorption device. Analytes can adsorb to different sorbent materials in the sorbent tube, and then the sorbent tube can be heated using a heating device to sequentially desorb the adsorbed analyte. The desorbed analyte can be provided to a gas chromatography device which can be separate or part of the thermal desorption device 920.

Figure 11:
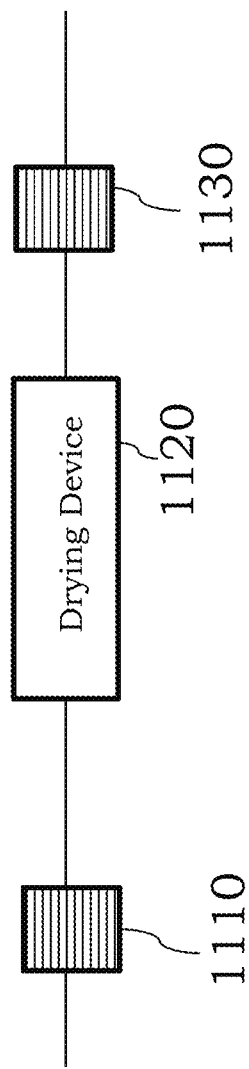
FIG. 11 is an illustration of a drying device and a humidity sensor upstream and downstream of the drying device, in accordance with certain embodiments.

In some examples, the systems described herein may comprise more than a single humidity sensor. Referring to FIG. 11, a first humidity sensor 1110 is positioned upstream of a drying device 1120, e.g., positioned between a sample introduction device (not shown) and the drying device 1120, and a second humidity sensor 1130 is positioned downstream of the drying device 1120, e.g., positioned between a thermal desorption device (not shown) and the drying device 1120. The two humidity sensors 1120, 1130 can be used to compare the amount of water in the sample prior to the sample being dried and after the sample is dried as an indirect way to monitor drying capacity and/or the state of the desiccant material in the drying device 1120.

Figure 12:
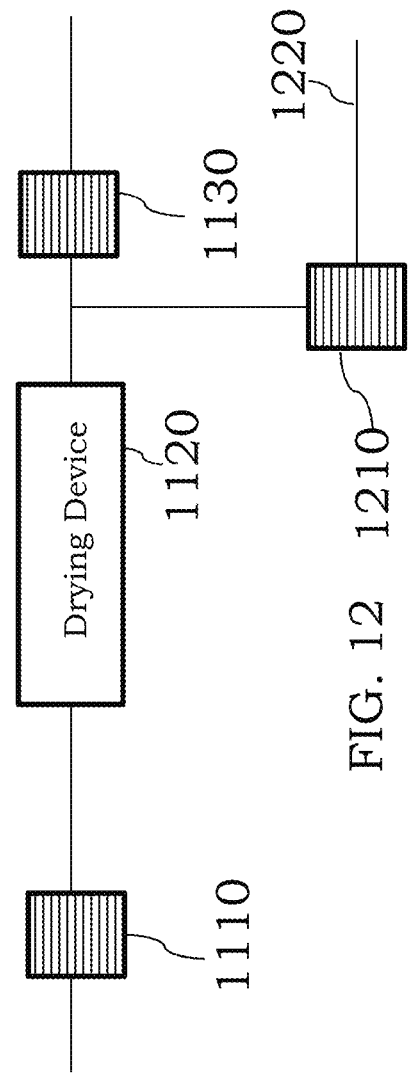
FIG. 12 is an illustration of a drying device and three humidity sensors, in accordance with certain embodiments.

In certain examples, the systems described herein may also comprise a third humidity sensor that can be used to monitor fluid exiting the drying device 1120 during regeneration of the desiccant material. Referring to FIG. 12, a third humidity sensor 1210 is shown as being fluidically coupled to the drying device 1120 and a vent line 1220. During regeneration, air flowing from a dry air gas source can be used in combination with heating of the desiccant material in the drying device 1120 to remove adsorbed water. The humidity sensor 1210 can be used to monitor water levels exiting the drying device 1120 as a measure of the regeneration status of the drying device 1120. For example, a valve (not shown) can fluidically couple the drying device 1120 to the humidity sensor 1210 during regeneration to permit water to flow out of the drying device 1120 and to the humidity sensor 1210. Once the water level reaches a suitable level, e.g., around or below about 5% relative humidity, then the drying device 1120 can be considered ready for re-use in sampling operations.

Figure 13:
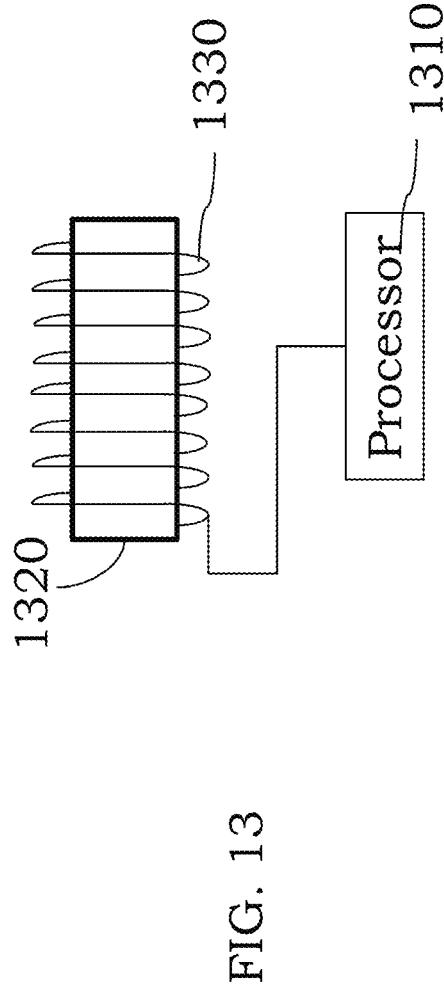
FIG. 13 is an illustration of a processor electrically coupled to a heating device, in accordance with certain examples.

The systems described herein may also comprise additional components such as valves, air sources, detectors, chromatography columns and other components as needed to perform sample analyses on gaseous samples. In some instances, the system may comprise a processor configured to control regeneration of the regenerable, desiccant medium between each sample introduced into the thermal desorption device. Referring to FIG. 13, a simplified schematic is shown where a processor 1310 is electrically coupled to a heating device 1330 thermally coupled to a drying device 1320. The processor can control heating and/or cooling of the device 1330 to regenerate the desiccant material in the drying device 1320. The processor 1310 may also be electrically coupled to valves, sample introduction devices, thermal desorption devices, etc. in the system to control the various system components during analysis.

Figure 14:
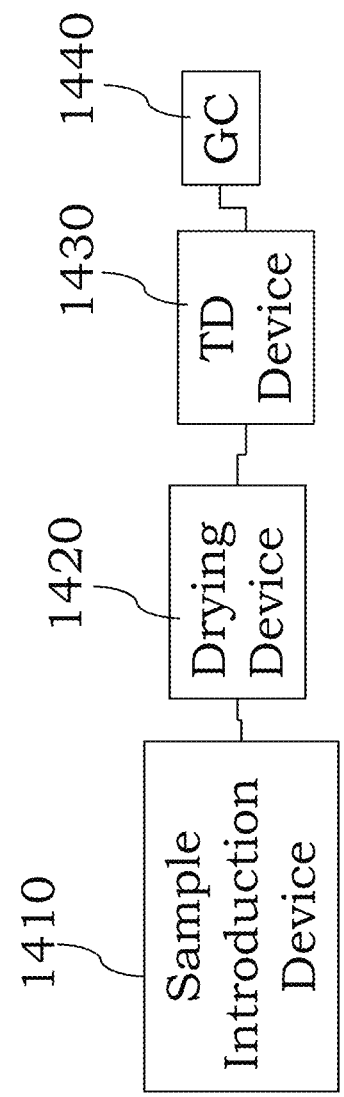
FIG. 14 is a block diagram of a system comprising a sample introduction device, a drying device, a thermal desorption device and a gas chromatography device, in accordance with certain examples.

In other configurations, a thermal desorption system may comprise a sample introduction device, a drying device, a thermal desorption device and a gas chromatography device. Referring to FIG. 14, the system 1400 comprises a sample introduction device 1410 fluidically coupled to a drying device 1420. The drying device 1420 is fluidically coupled to a thermal desorption (TD) device 1430. The thermal desorption device 1430 is fluidically coupled to and a gas chromatography device 1440, which can be an integral part of the thermal desorption device 1430 if desired. The sample introduction device 1410 is configured to sample ambient air or fluid comprising gaseous analyte species. The sample introduction device 1410 provides the fluid comprising gaseous analyte species to the drying device 1420. As noted herein, the drying device 1420 comprises a desiccant material or medium which can remove water in the fluid received from the sample introduction device 1410. In some examples, the drying device 1420 comprises a regenerable, desiccant medium configured to adsorb water from the fluid without adsorbing at least one of alpha-pinene, beta-pinene, ethanol, acetone, formaldehyde, acetaldehyde and benzaldehyde in the fluid. For example, the drying device 1420 may comprise one or more calcium, sodium, magnesium or lithium salts which can remove water without adsorbing at least one of alpha-pinene, beta-pinene, ethanol, acetone, formaldehyde, acetaldehyde and benzaldehyde in the fluid received from the sample introduction device 1410. The dried fluid may then be provided to the thermal desorption device 1430 which can be configured to receive a sorbent tube comprising a sorbent medium. For example, the sorbent medium of the sorbent tube can be effective to adsorb and desorb gaseous analyte species in the fluid. In some examples, the materials in the sorbent materials are selected so that they are effective to adsorb and desorb at least one of alpha-pinene, beta-pinene, ethanol, acetone, formaldehyde, acetaldehyde and benzaldehyde in the fluid received from the drying device 1420. In other instances, higher molecular weight species such as polyaromatic hydrocarbons (PAHs) and/or benzene/toluene/ethyl benzene/xylenes (BTEX) analytes may also be analyzed. Depending on the molecular weight and properties of the analytes believed to be in an air sample, the exact sorbent materials used can vary as desired. In some examples, the sorbent materials in the sorbent tube of the desorption device 1430 may comprise molecular sieves, graphitized carbon blacks or combinations thereof. Once the analyte species are adsorbed using the sorbent tube, they can be desorbed sequentially and provided to the gas chromatography device 1440 for separation and detection. The gas chromatography device 1440 typically comprises a column with a separation medium which can separate the various species present in the sampled fluid. Individual analyte components may elute from the column and can be provided to a detector, e.g., a flame ionization detector, a flame photometric detector, a thermal conductivity detector, an electron capture detector, a nitrogen-phosphorous detector, a photo-ionization detector, a thermionic ionization detector and other detectors. As noted herein, the system 1400 may be configured without a membrane dryer to avoid adsorption/removal of any one or more of the alpha-pinene, beta-pinene, ethanol, acetone, formaldehyde, acetaldehyde and benzaldehyde using the membrane dryer.

Once the fluid is sampled, the regenerable desiccant material present in the drying device 1420 can be regenerated using a heating device (not shown) thermally coupled to the drying device 1420. A processor (not shown) may be present within the thermal desorption device 1430 and can be used to control heating/regeneration of the drying device 1420 desiccant material. Heating can be performed to drive off any adsorbed water from the desiccant material of the drying device 1420 to permit further analysis of another fluid sample using the same drying device 1420.

In certain configurations, the system 1400 may also comprise a humidity sensor between the drying device 1420 and the thermal desorption device 1430 and fluidically coupled to each of the drying device 1420 and the thermal desorption device 1430. The humidity sensor can be used to ensure that a suitable amount of water has been removed by the drying device 1420. In other configurations, the system 1400 may comprise a first humidity sensor upstream of the drying device 1420 and fluidically coupled to each of the drying device 1420 and the sample introduction device 1410. The first humidity sensor can be used to monitor how much water is present in the sampled fluid stream. If desired, the system 1400 may also comprise a second humidity sensor downstream of the drying device 1420 and fluidically coupled to the drying device 1420 and the thermal desorption device 1430. The second humidity sensor can be used to measure water levels and ensure that a suitable amount of water has been removed by the drying device 1420 and/or to compare water levels measured by the first humidity sensor to monitor the status of the drying device 1420, e.g., to monitor whether the drying device 1420 is still removing water or needs regeneration. In other instances, the system 1400 may comprise a third humidity sensor downstream of the drying device 1420 and configured to measure moisture in a regenerated air flow exiting the thermal desorption system 1400 during regeneration of the regenerable, desiccant medium in the drying device 1420. Additional components such as a cooling device thermally coupled to the drying device 1420, one or more valves, processors, etc. may also be present in the system 1400.

In some instances, the sorbent tubes described herein, e.g., those used in a thermal desorption device, may comprise an integral drying device or be coupled directly to a drying device. For example, a drying device can be coupled to the sorbent tube upstream of a sampling inlet of the sorbent tube to remove any water from an air stream prior to providing the air stream into the sorbent tube. Such a drying device may be used within a thermal desorption device or where the sorbent tube is used for remote air sampling applications the drying device can be decoupled from the sorbent tube prior to analysis of the adsorbed species within the sorbent tube.

In certain examples, the drying devices described herein can be used in thermal desorption methods to remove gaseous water from an air sample. For example, the drying device can be used to remove gaseous water from the fluid comprising the gaseous analyte species by providing the fluid to a drying device comprising a regenerable desiccant medium. The drying device can be positioned upstream of the thermal desorption device to adsorb water in the fluid using the regenerable, desiccant medium and without adsorbing the gaseous analyte species in the fluid to provide a dehumidified fluid comprising the gaseous analyte species. The dehumidified fluid comprising the gaseous analyte species can be provided from the drying device to a thermal desorption device to permit adsorption of the gaseous analyte species using a sorbent medium, e.g., in a sorbet tube, within the thermal desorption device. The desorption device can be used to sequentially desorb the adsorbed gaseous analyte species from the sorbent medium, and the desorbed species can be detected optionally following separation using gas chromatography or other suitable separation methods.

In certain examples, the method comprises regenerating the regenerable, desiccant medium between analyses of the fluid by heating the regenerable, desiccant medium to provide a regenerated, desiccant medium. For example, the desiccant medium can be regenerated between each analysis and/or while the thermal desorption device is desorbing the analyte materials. In some embodiments, the desiccant medium can be cooled post regeneration so that it is present at a sampling temperature during sampling of the air sample. If desired, a humidity value of fluid exiting the drying device during regeneration of the desiccant medium can be monitored until the humidity value drops below a desired value, e.g., 5% relative humidity or less. For example, heating of the regenerable, desiccant medium can be maintained until a detected humidity of less than 5% relative humidity is detected to provide the regenerated, desiccant medium. Introduction of a dry gas from a gas source can be used to assist removal of water from the desiccant medium during regeneration. If desired, the dry gas can be heated to assist in heating of the desiccant medium during regeneration. Where the desiccant medium comprises a color indicator, the color can be monitored visually or optically to determine the hydration state of the desiccant medium. As noted herein, the regenerable, desiccant medium can be a non-deliquescing, inorganic desiccant medium so that it remains in solid form even when hydrated. If desired, the drying device can be configured with a single cavity or two or more cavities. In some instances, the drying device may be modular so two or more individual drying devices can be plugged into each other to increase the overall length of the drying device.

In some examples, the devices described herein can be used to analyte at least one of alpha-pinene, beta-pinene, ethanol, acetone, formaldehyde, acetaldehyde and benzaldehyde in a gaseous air sample using thermal desorption. As noted herein, conventional dryers tend to absorb and/or remove one or more of these materials during drying. Using the drying devices described herein a gaseous air sample can be provided to a drying device comprising a regenerable, desiccant medium to remove water in the gaseous air sample without removing the at least one alpha-pinene, beta-pinene, ethanol, acetone, formaldehyde, acetaldehyde and benzaldehyde to provide a dehumidified air sample comprising the at least one alpha-pinene, beta-pinene, ethanol, acetone, formaldehyde, acetaldehyde and benzaldehyde to provide a dehumidified air sample. If desired, higher molecular weight analytes or other analytes may also be present in the air sample and analyzed using the devices described herein. The dehumidified air sample from the drying device can be provided to a thermal desorption device to permit adsorption of the at least one alpha-pinene, beta-pinene, ethanol, acetone, formaldehyde, acetaldehyde and benzaldehyde in the gaseous air sample using a sorbent medium within the thermal desorption device to provide adsorbed analyte species on the sorbent medium. Once adsorbed, the analytes can be sequentially desorbed from the sorbent medium. The desorbed analytes can be separated, e.g., using gas chromatography, and then sequentially detected. The amount of each of the alpha-pinene, beta-pinene, ethanol, acetone, formaldehyde, acetaldehyde and benzaldehyde (and any other analytes) can be determined by comparison to a calibration curve or using other suitable methods.

In certain examples, the method comprises regenerating the regenerable, desiccant medium between analyses of the gaseous air sample by heating the regenerable, desiccant medium to provide a regenerated, desiccant medium. In some instances, the method comprises cooling the regenerated, desiccant medium prior to introducing fluid comprising the gaseous analyte species into the desiccant device. In other examples, the method comprises detecting a humidity of fluid exiting the drying device during the regeneration of the regenerable, desiccant medium and maintaining heating of the regenerable, desiccant medium until a detected humidity of less than 5% relative humidity is detected to provide the regenerated, desiccant medium. In some instances, the method comprises regenerating the regenerable, desiccant medium using a dry gas. In further examples, the method comprises heating the dry gas, the desiccant medium or both during the regenerating of the regenerable desiccant medium. In certain embodiments, the method comprises configuring the regenerable, desiccant medium to change color when it hydrates and detecting the color change using an optical sensor. In additional examples, the method comprises configuring the regenerable, desiccant medium as a non-deliquescent, inorganic desiccant medium. In some examples, the method comprises configuring the drying device with a first cavity comprising the regenerable, desiccant medium and a second cavity comprising the regenerable, desiccant medium, and using the second cavity when the regenerable, desiccant medium of the first cavity becomes hydrated, and regenerating the regenerable, desiccant medium of the first cavity while the second cavity is being used for analysis. In some instances, the method comprises configuring the drying device as a modular drying device configured to couple to another drying device to increase the overall length of the drying device.

In certain configurations, the drying devices described herein can be implemented or used with a system comprising one or more processors and/or one or more computer systems or control boards. The processor or computer system typically is separate from the drying device though it may be electrically coupled to some component of the drying device if desired. At least one processor can also be electrically coupled to one or more memory units to receive input data and/or store any data. The processor may be, for example an Intel PENTIUM-type processor, Motorola PowerPC, Sun UltraSPARC, Hewlett-Packard PA-RISC processors, or any other type of processor. A processor can be, if desired, connected to a heating device, a cooling device, a thermal desorption device, one or more valves, etc. and can be used in combination with one or more memory devices, such as a disk drive, memory, or other device for storing data. Memory is typically used for storing programs and data during use of the system comprising the drying device. Components of the system may be coupled by an interconnection device, which may include one or more buses (e.g., between components that are integrated within a same component) and/or a network (e.g., between components that reside on separate discrete components). The interconnection device provides for communications (e.g., signals, data, instructions) to be exchanged between components of the system. The processor and other components are electrically coupled to a power source. In addition, the drying device may comprise one or more interfaces that connect to the processor and optionally to a separate device or system such as, for example, a communication network (in addition or as an alternative to the interconnection device). Illustrative interfaces include, but are not limited to, a serial ATA interface, ISA interface, PCI interface or the like or one or more wireless interfaces, e.g., a Bluetooth device, a WiFi device, a Near Field Communication device, a cellular device or other wireless protocols and/or interfaces.

In certain embodiments, the storage system present in the system comprising the drying device typically includes a readable and writeable nonvolatile recording medium in which data can be stored. The medium may, for example, be a solid state memory chip, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system comprising the drying device may also include specially-programmed, special-purpose hardware, for example, an application-specific integrated circuit (ASIC) or a field programmable gate array (FPGA). Aspects of the technology may be implemented in software, hardware or firmware, or any combination thereof. The thermal desorption device, GC or both may use or include a high-level computer programming language or specially programmed, special purpose hardware.

In certain examples, the processor and any associated devices may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate electrical components could also be used. In certain examples, the hardware or software can be configured to implement cognitive architecture, neural networks or other suitable implementations. In some instances, various configurations may be programmed using an object-oriented programming language, such as SmallTalk, Basic, Java, C++, Ada, or C # (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. Further, certain configurations of a system comprising a drying device may comprise a menu, mobile device, laptop, tablet, etc. to permit control or interaction with the system.

In certain embodiments, the drying devices described herein may be present in a carousel or cartridge that comprises two or more input ports. A respective drying device can be fluidically coupled to each input port to permit fluid flow between the input port and the drying device. One illustration is shown in FIG. 15A, where a carousel 1500 comprises a first drying device 1510 and a second drying device 1520. For illustration purposes, the drying device 1510 is positioned at top dead center in FIG. 15A which provides fluid communication between a sample introduction device (not shown) and the particular drying device positioned at top dead center. The drying device 1510 can be used until regeneration of the desiccant material is needed. Rotation of the carousel by 180 degrees fluidically decouples the drying device 1510 from the sample introduction device and fluidically couples the drying device 1520 to the sample introduction device as shown in FIG. 15B. The drying device 1510 can then be regenerated and used again when the drying device 1520 needs regeneration. This configuration permits continuous air sampling without the need to wait for the desiccant material in any one drying device to regenerate. While two drying devices 1510, 1520 are shown in FIGS. 15A and 15B, three, four, five, six or more drying devices could instead be present. While not shown, each of the drying devices 1510, 1520 may comprise a respective heating device or a common heating device can be used to heat the drying devices when they are in the bottom position shown in FIGS. 15A and 15B. Cartridge configurations and non-rotating configurations comprising two or more drying devices may also be used. For example, a drying device cartridge with one or more internal valves can be used to switch between using two or more internal drying devices present in the cartridge.

Certain specific examples are described below to facilitate a better understanding of the technology described herein.

EXAMPLE 1

To evaluate the effectiveness of desiccant materials for drying air samples introduced into an automated thermal desorption system, four phases were performed: (1) Qualitatively measuring the drying performance of potential desiccants; (2) testing the selected desiccant materials with VOCs sample set using an ATD-GC system; (3) developing an automated process to regenerate wetted desiccant; and (4) determining desiccant housing and matrix.

For phase 1 six different desiccant materials were selected including Potassium Carbonate ($K_2CO_3$, Sigma Aldrich), Lithium Bromide (LiBr, Sigma Aldrich, anhydrous, beads, ~10 mesh), Lithium Chloride (LiCl, anhydrous, free flowing, Sigma Aldrich), Sodium Sulfate ($Na_2SO_4$), Calcium Sulfate ($CaSO_4$) and Calcium Chloride dihydrate ($CaCl_2.2H_2O$, Sigma Aldrich).

Each desiccant material was packed into a glass tube (0.25" OD×3.5" in length) with silanized glass wool stuffed in each end to hold the desiccant material in place. A Nation® membrane dryer (Permapure, MD-050-48S-2) was also tested as a control.

Figure 16:
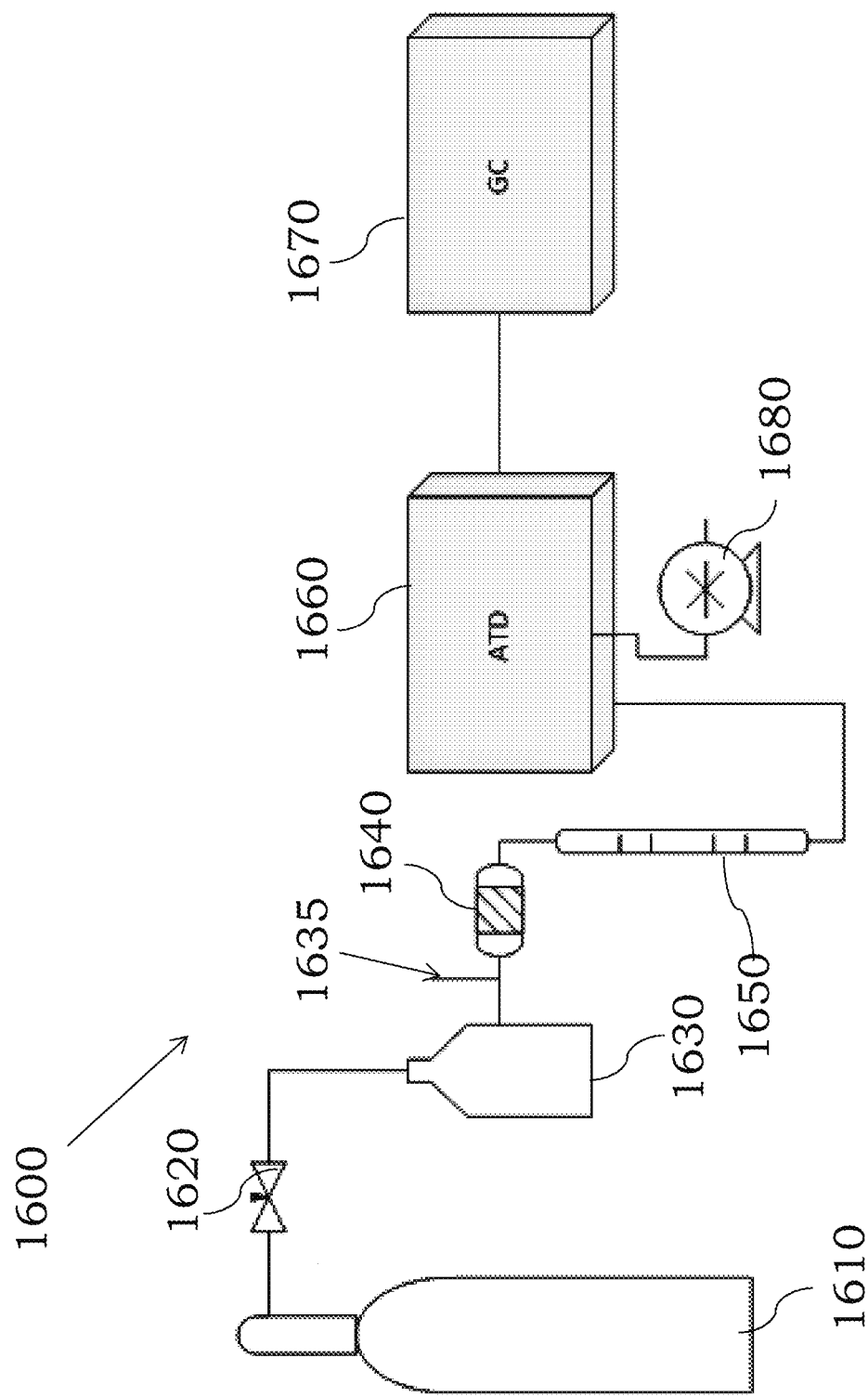
FIG. 16 is an illustration of a thermal desorption system comprising a drying device, in accordance with certain examples.

To test each desiccant material, dry air was throttled by a needle valve and bubbled through deionized water in a gas washing vessel (see FIG. 16 and the accompanying description below). The humidified air was sent through the desiccant material at ~40-70 cc/min. The inlet and outlet humidity values were measured by an integrated circuit humidity sensor (Honeywell HIH-4010-004) fitted into a Swagelok nut. An analog signal from the humidity sensor was collected by Omega OMB-DAQ-2408-2AO.

Table 1 shows the results from the humidity sensor measurements.

TABLE 1

| Desiccant | Inlet % RH | Min Outlet % RH | Expt. Time (min) | End % RH |
|---|---|---|---|---|
| PermaPure Nafion ® Dryer | 90 | 6 | 6 | 6 |
| $K_2CO_3$ | 90 | 11 | 30 | 16 |
| LiBr | 87 | 5 | 40 | 5 |
| LiCl | 90 | 5 | 50 | 5 |
| $Na_2SO_4$ | 80 | 65 | 50 | 70 |
| $CaSO_4$ | 70 | 0 | 60 | 40 |
| $CaCl_2$ | 80 | 7 | 60 | 7 |

The desiccant performance tests showed that the desiccant materials best able to remove moisture from an almost saturated air stream were LiBr, LiCl, $CaCl_2$, and to a lesser extent $CaSO_4$.

EXAMPLE 2

A sample set of six different volatile organic compounds (Table 2) was chosen to be measured by a hyphenated PerkinElmer Turbo Matrix 300 ATD-Clarus 680 GC system.

TABLE 2

| Compound | Concentration (M) | Sample Mass Injected (ng) | Retention Time (min) |
|---|---|---|---|
| Carbon Tetrachloride* | Headspace | 8000-50000 | 5.00 |
| Ethanol* | Headspace | 1300-13000 | 1.97 |
| Acetaldehyde* | Headspace | NA | NA |
| Toluene | $2.82 \times 10^{-4}$ | 26-130 | 8.93 |
| n-Heptane | $2.69 \times 10^{-4}$ | 8.1-135 | 6.058 |
| alpha-pinene* | $1.87 \times 10^{-3}$ | 86-430 | 12.69 |

Headspace injections were conducted by sampling the headspace above the pure compound. The mass injected was calculated by estimating the room temperature vapor pressure above the compound. The solvent used in the solutions was methanol. Acetaldehyde was originally chosen as part of the VOC set but because of its low boiling point and retention time roughly equal to that of ethanol, it was not used in the analysis.

The ATD was equipped with an online sampling kit and operated in online sampling mode. The method applied in the ATD had online sampling lasting for 10 minutes at 40 cc/min, during which, the trap was kept at −30° C. The rotary analytical valve and transfer column were kept at 250° C. The inlet split was 0 cc/min and the outlet split was 10 cc/min. Trap desorption occurred at 280° C. and lasted for 20 minutes while the total cycle time was 40 min. The column pressure was set to 30 psig. The column used in the GC was a Restek 624 w/integra-Guard 60 meter, 0.25 mm ID fused silica column (Cat #10969-124). During sample injection into the GC, the oven was kept at 40° C. for 5 min and subsequently ramped at 10 C°/min to 230° C. where it was kept for another ten minutes. The FID detector was kept at 275° C. and air and hydrogen flows were 450 and 45 cc/min respectively. An illustration of the system is shown in FIG. 16. The system 1600 comprises a dry, pure nitrogen gas source (%99.999) 1610 that was throttled into a gas washer 1630 by way of a needle valve 1620 before being sent into an injection manifold 1640. An overblow port 1635 was installed before the manifold 1640 to keep injections at atmospheric pressure. Syringe injections into the humidified nitrogen stream of solutions or gas from headspace vials were made through a silicone septum. Humidity sensors (not shown) were placed upstream of the injection manifold 1640 and downstream of the drying device 1650.

Figure 17:
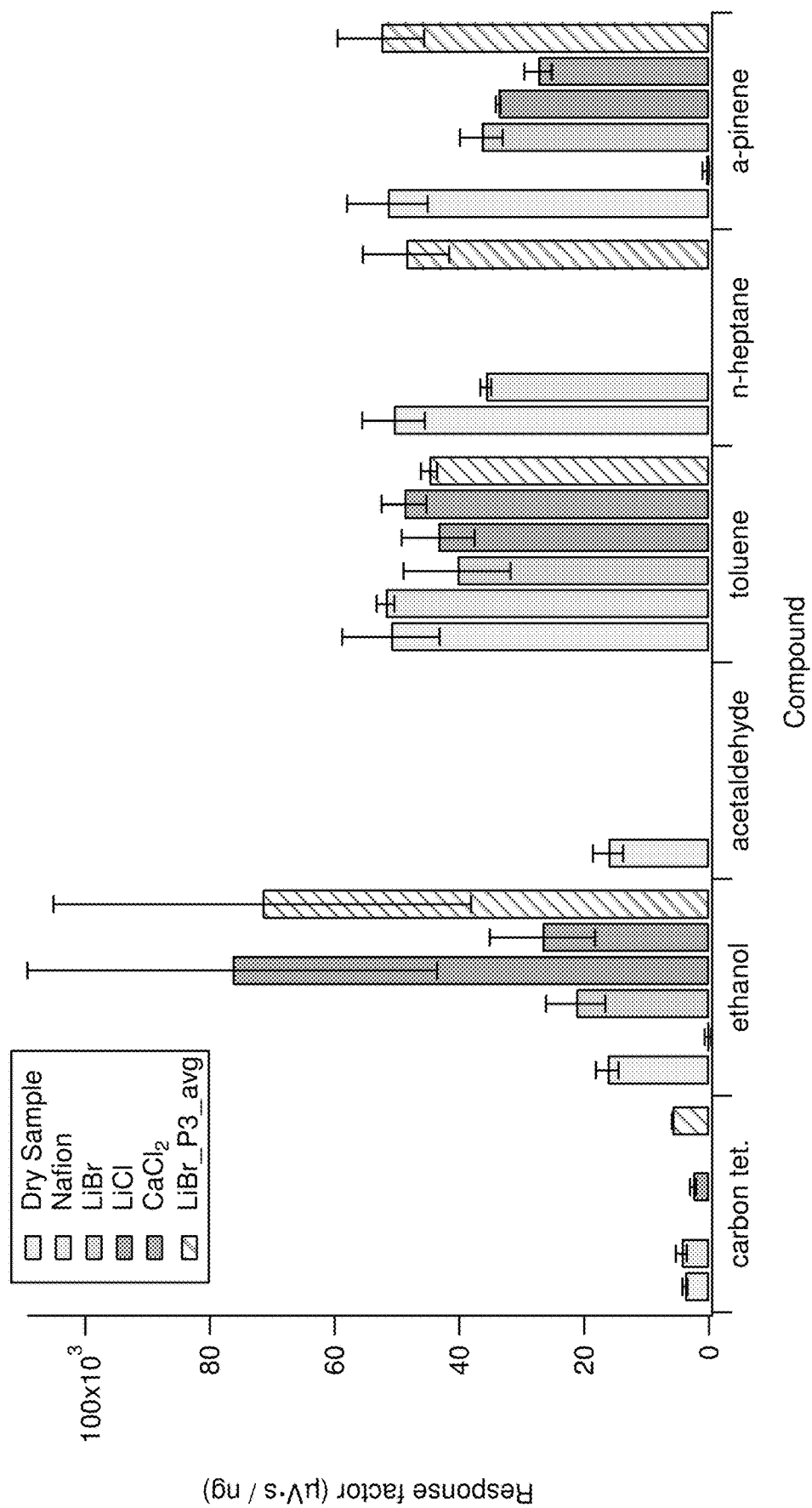
FIG. 17 is a graph showing the results of volatile organic compound (VOC) testing using different desiccant materials, in accordance with certain embodiments.

Desiccant material was packed into the drying device as previously described in Example 1, though the drying device was oriented vertically so that flow was against gravity. Control experiments were conducted in which the drying device 1650 was replaced with a Nation® membrane dryer and in which no drying method was used and the gas washer was bypassed. VOC injections were made during the first five minutes of the online sampling period and analyzed using an automated thermal desorber (ATD) 1660 fitted with a diaphragm pump 1680. A gas chromatograph 1670 was used to separate the desorbed VOCs. Data was acquired and analyzed using TotalChrome. At the end of each day, the desiccant was regenerated. This regeneration was accomplished by flowing dry nitrogen through the unused carrier port on the gas chromatograph (GC) 1670 and connecting the drying device 1650 to the injector within the GC oven. The oven temperature was set to 200° C. and left overnight. FIG. 17 shows the test results for the VOCs. Data represented by "LiBr_P3_avg" in FIG. 17 represents experiments using automation and diatomite packed desiccant tubes.

The results shown in FIG. 17 are consistent with the Nation® membrane dryers losing polar compounds like ethanol and alpha-pinene. The results are also consistent with the selected desiccants being relatively inert to the sample of compounds. It is unclear why the response factors for ethanol vary so widely; carryover from previous injections may be possible.

Over time, the desiccant materials became wet, reducing their drying ability and, more often, clogging sample flow. Desiccants were manually regenerated by putting them in the GC oven at the end of the day and flowing dry nitrogen through the tube. Many times regeneration was unsuccessful or of little use as clogs became persistent once established. LiBr showed the least resistance to clogging, likely due to the spherical shape of the granules. Calcium chloride seemed to wet very easily and LiCl moderately so. LiBr became the desiccant of choice in the Example 3 described below.

EXAMPLE 3

A roughly 5 to 1 mixture of LiBr with diatomite filler (Chromasorb G, 45/60 mesh, acid washed, treated with DMCS) was packed into a 100 mm×4.6 mm ID (0.25 in OD) stainless steel tube to form a drying device. Each end was closed with a fit (AX60-3473). The drying device was used in the system shown in FIG. 18. The automated system of FIG. 18 was constructed to generate humidified air, sample VOCs, dry sample air, and regenerate desiccants. The system in FIG. 18 included a nitrogen gas source 1802, a needle valve 1804, a hydrocarbon trap 1806, a solenoid valve 1810, a gas bubbler 1812, a solenoid valve 1814, a check valve 1816, a humidity sensor 1818, an injection manifold 1820, a drying device 1822 with associated heating rope 1824, a humidity sensor 1826, a thermal desorption device 1828, a gas chromatograph 1830, a diaphragm pump 1832, a humidity sensor 1834 and a check valve 1836.

Figure 18:
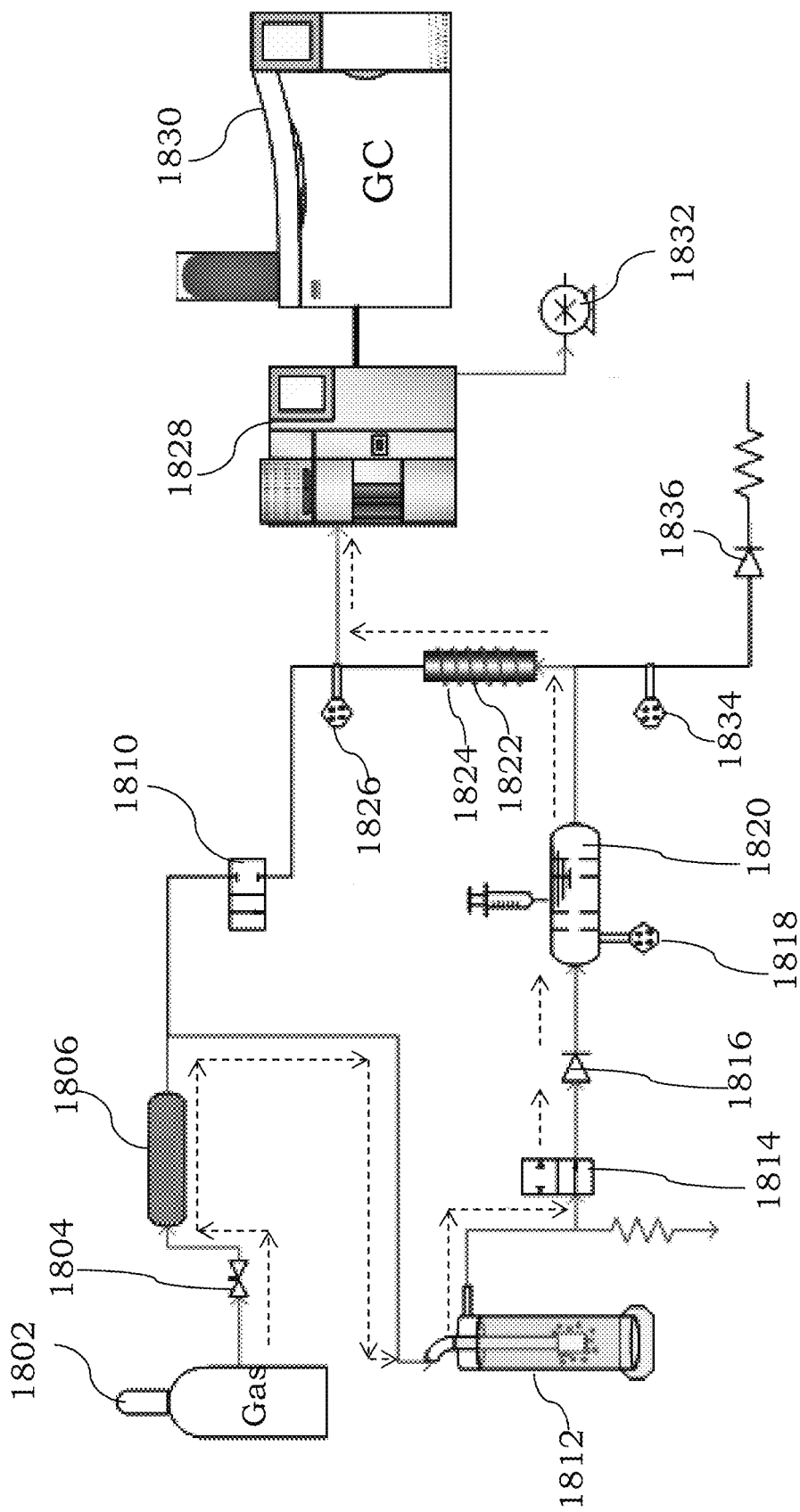
FIG. 18 is an illustration of a thermal desorption system comprising a drying device and showing fluid flow during VOC sampling, in accordance with certain embodiments.

In FIG. 18, the dotted path represents the airflow during VOC sampling mode, flow is controlled by two 2-way, 2-port solenoid valves 1810, 1814 (Clippard ETO-3-24V) and two check valves 1816 1836 (CZPX0016527S, 4 mm Zero leak, Press In, 4 kPa, EPDM). Dry nitrogen gas from source 1802 is humidified by a bubbler 1812 and carries injected sample through the drying device 1820 and into the ATD 1828. Humidity sensors 1818, 1826 measure the humidity upstream (sensor 1818) and downstream (sensor 1826) of the desiccant material of the drying device 1820. Timing of the valves and the start of the temperature method were controlled by the ATD's built in relays.

When online sampling ends and the ATD sorbent trap is heated, relays in the ATD 1828 switch to turn on the temperature controller (Omega CN32PT-144-C24) and switch the positions of the solenoid valves 1810, 1814. The flow changes are shown in the dotted line of FIG. 19. Dry nitrogen from the source 1802 flows over the wetted desiccant of the drying device 1822, and out into the environment through the check valve 1836. The humidity of this outgoing air is measured by a third humidity sensor 1834. The temperature controller heats the desiccant material of the drying device to 200 degrees and it is held there for roughly 20 minutes. A few minutes before online sampling starts again, the drying device 1820 is cooled with a fan (not shown).

Figure 19:
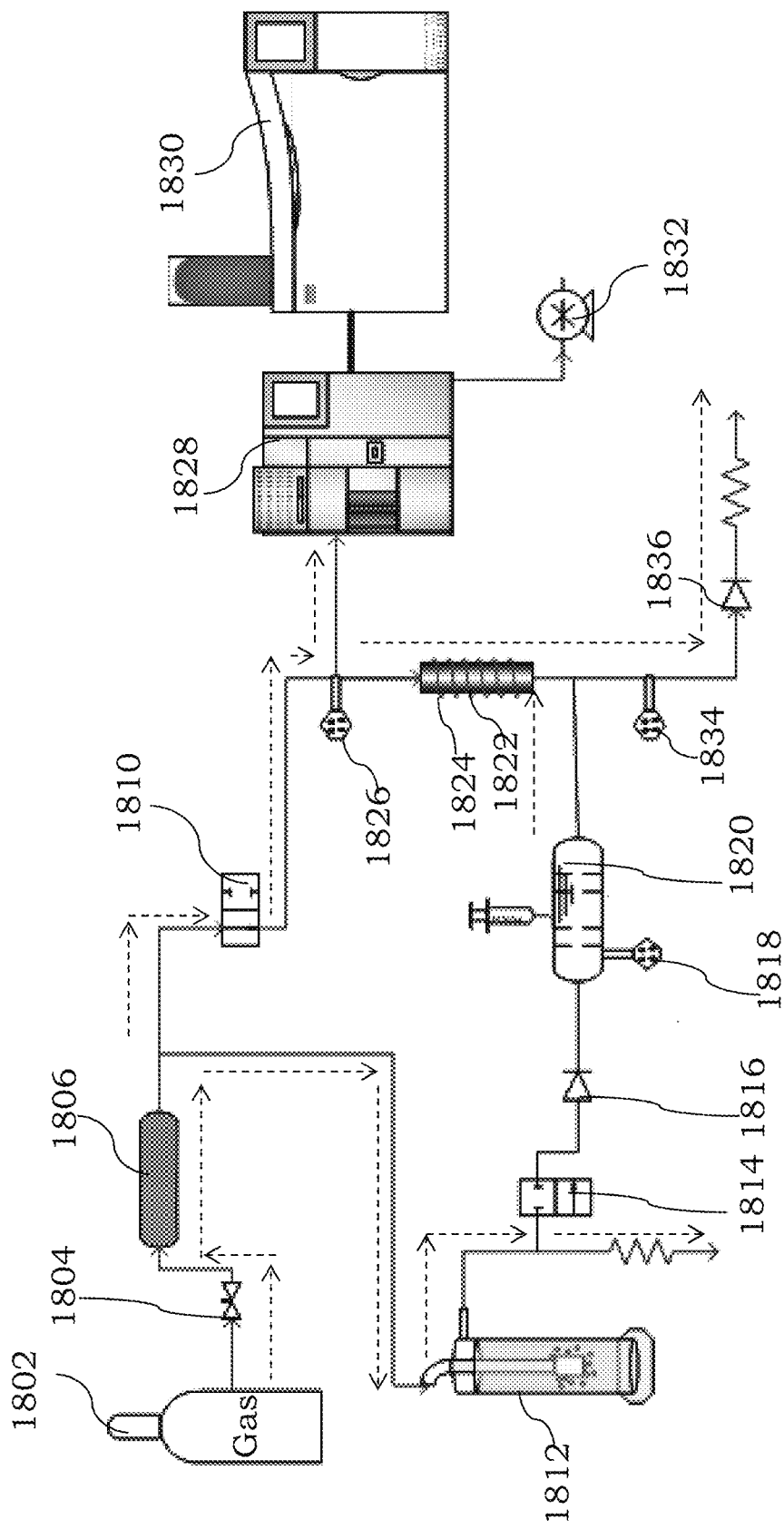
FIG. 19 is an illustration of a thermal desorption system comprising a drying device and showing fluid flow during regeneration of the drying device in accordance with certain embodiments.
Figure 20:
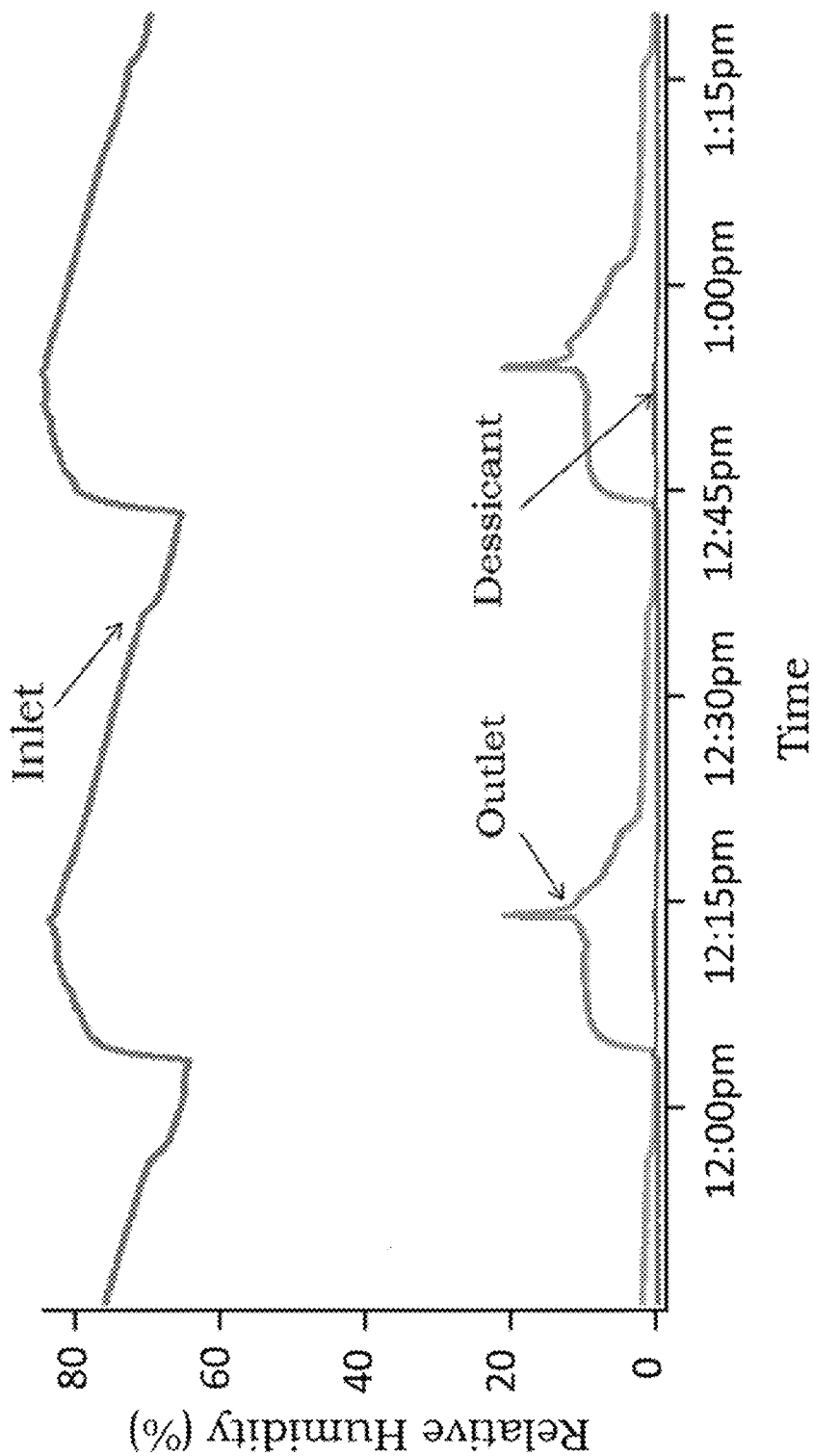
FIG. 20 is a graph showing humidity values for various humidity sensors, in accordance with certain configurations.

The system of FIGS. 18 and 19 was successful in automatically drying humidified sample streams, measuring injected VOCs, and regenerating the desiccant. FIG. 20 shows the humidity measured at different locations of the system as it cycles through various modes. Online sampling of humidified air is marked by simultaneous increases in humidity of inlet and outlet humidity values. Trap heating and GC analysis occurs concurrently with desiccant regeneration and is represented by a decrease in outlet humidity. The desiccant material could survive several hundred regeneration cycles before it became sufficiently clogged and had to be replaced.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, configurations, examples and embodiments have been described above, it will be recognized by the person of ordinary skill in the art, given the benefit of this disclosure, that additions, substitutions, modifications, and alterations of the disclosed illustrative aspects, configurations, examples and embodiments are possible.

What is claimed is:

1. A system comprising:
   a sample introduction device configured to introduce an ambient air stream comprising gaseous analyte species and water vapor into a thermal desorption device fluidically coupled to the sample introduction device, wherein the sample introduction device is configured as an injection manifold;
   a drying device fluidically coupled to each of the sample introduction device and the thermal desorption device, the drying device positioned between the sample introduction device and the thermal desorption device, in which the drying device comprises a regenerable desiccant medium that is effective to adsorb water without adsorption of the gaseous analyte species in the introduced ambient air stream, wherein the thermal desorption device comprises a sorbent tube comprising a sorbent medium and a heating device configured to heat the sorbent tube to desorb analyte species adsorbed to the sorbent medium in the sorbent tube,
   a first humidity sensor upstream of the drying device and fluidically coupled to each of the sample introduction device and the drying device;
   a second humidity sensor downstream of the drying device and fluidically coupled to the drying device and the thermal desorption device; and
   a third humidity sensor fluidically coupled to the drying device and configured to measure moisture in a regenerated air flow exiting the drying device during regeneration of the regenerable, desiccant medium.

2. The system of claim 1, further comprising a cooling device thermally coupled to the drying device and configured to cool the regenerable desiccant medium after regeneration.

3. The system of claim 2, further comprising a detector fluidically coupled to the thermal desorption device.

4. The system of claim 1, wherein the drying device comprises a first cavity comprising the regenerable, desiccant medium and a second cavity comprising the regenerable, desiccant medium.

5. The system of claim 4, further comprising a valve between the sample introduction device and the drying device, wherein the valve is configured to fluidically couple the sample introduction device to the first cavity in a first state of the valve and is configured to fluidically couple the sample introduction device to the second cavity in a second state of the valve.

6. The system of claim 1, in which the regenerable desiccant medium comprises an inorganic salt.

7. The system of claim 6, in which the inorganic salt is a calcium salt or a lithium salt.

8. The system of claim 1, in which the system does not include a membrane dryer.

9. The system of claim 1, further comprising a heating device thermally coupled to the drying device, wherein the regenerable desiccant medium is regenerated by heating of the desiccant medium using the heating device.

10. The system of claim 1, wherein ambient air flow through the drying device is configured to flow against gravity.

11. The system of claim 1, further comprising a dry air source fluidically coupled to the drying device.

12. The system of claim 11, further comprising a valve downstream of the drying device, wherein the valve downstream of the drying device is configured to open when the regenerable, desiccant medium in the drying device is being regenerated to permit water exiting the drying device to vent from the system.

13. A system comprising:
a sample introduction device configured to introduce an ambient air stream comprising gaseous analyte species and water vapor into a thermal desorption device fluidically coupled to the sample introduction device; and
a drying device fluidically coupled to each of the sample introduction device and the thermal desorption device, the drying device positioned between the sample introduction device and the thermal desorption device, in which the drying device comprises a regenerable desiccant medium that is effective to adsorb water without adsorption of the gaseous analyte species in the introduced ambient air stream, wherein the thermal desorption device comprises a sorbent tube comprising a sorbent medium and a heating device configured to heat the sorbent tube to desorb analyte species adsorbed to the sorbent medium in the sorbent tube, wherein the regenerable, desiccant medium comprises calcium sulfate and the sorbent medium in the sorbent tube comprises at least three different graphitized carbon blacks.

14. The system of claim 13, further comprising a humidity sensor between the drying device and the thermal desorption device and fluidically coupled to each of the drying device and the thermal desorption device.

15. The system of claim 13, further comprising a humidity sensor integral to an outlet of the drying device.

16. The system of claim 13, wherein the sample introduction device is configured as an injection manifold.

17. The system of claim 16, further comprising a first humidity sensor upstream of the drying device and fluidically coupled to each of the sample introduction device and the drying device, wherein the system further comprises a second humidity sensor downstream of the drying device and fluidically coupled to the drying device and the thermal desorption device.

18. The system of claim 13, in which the system does not include a membrane dryer.

19. The system of claim 13, wherein ambient air flow through the drying device is configured to flow against gravity.

20. The system of claim 13, further comprising a dry air source fluidically coupled to the drying device.

21. The system of claim 20, further comprising a valve downstream of the drying device, wherein the valve downstream of the drying device is configured to open when the regenerable, desiccant medium in the drying device is being regenerated to permit water exiting the drying device to vent from the system.

22. The system of claim 13, further comprising a cooling device thermally coupled to the drying device and configured to cool the regenerable desiccant medium after regeneration.

23. The system of claim 22, further comprising a detector fluidically coupled to the thermal desorption device.

24. The system of claim 13, wherein the drying device comprises a first cavity comprising the regenerable, desiccant medium and a second cavity comprising the regenerable, desiccant medium.

25. The system of claim 24, further comprising a valve between the sample introduction device and the drying device, wherein the valve is configured to fluidically couple the sample introduction device to the first cavity in a first state of the valve and is configured to fluidically couple the sample introduction device to the second cavity in a second state of the valve.

* * * * *